(12) United States Patent
Galuten et al.

(10) Patent No.: US 7,624,046 B2
(45) Date of Patent: *Nov. 24, 2009

(54) ELECTRONIC MUSIC/MEDIA DISTRIBUTION SYSTEM

(75) Inventors: Albhy Galuten, Santa Monica, CA (US); Dmitry Radbel, Pacific Palasades, CA (US); Peter Williams, Sidney (AU)

(73) Assignee: Universal Music Group, Inc., Santa Monica, CA (US)

( * ) Notice: Subject to any disclaimer, the term of this patent is extended or adjusted under 35 U.S.C. 154(b) by 497 days.

This patent is subject to a terminal disclaimer.

(21) Appl. No.: 11/058,910

(22) Filed: Feb. 15, 2005

(65) Prior Publication Data

US 2005/0192871 A1   Sep. 1, 2005

Related U.S. Application Data

(63) Continuation-in-part of application No. 09/614,106, filed on Jul. 12, 2000, now abandoned, and a continuation-in-part of application No. 09/486,759, filed on Jun. 8, 2000, now abandoned, and a continuation-in-part of application No. 09/471,971, filed on Dec. 23, 1999, now Pat. No. 7,209,892.

(60) Provisional application No. 60/113,861, filed on Dec. 24, 1998, provisional application No. 60/116,555, filed on Jan. 21, 1999, provisional application No. 60/143,283, filed on Jul. 12, 1999.

(51) Int. Cl.
*G06Q 30/00*   (2006.01)

(52) U.S. Cl. .......................................... 705/26; 705/27

(58) Field of Classification Search .................. 705/26, 705/27
See application file for complete search history.

(56) References Cited

U.S. PATENT DOCUMENTS 5,629,980 A   5/1997   Stefik et al.

(Continued)

FOREIGN PATENT DOCUMENTS

AU   A-36840/97   2/1998

(Continued)

OTHER PUBLICATIONS

HTML 4.0 Specification, World Wide Web Consortium, Dec. 1997.

(Continued)

*Primary Examiner*—Robert M. Pond
(74) *Attorney, Agent, or Firm*—Darby & Darby P.C.

(57) ABSTRACT

A method for distributing content over a network by providing a predetermined electronic contract for distributing the content between a retailer and a distributor, wherein terms of the contract are independent of the content and the retailer distributes the content to a consumer and the distributor has rights in the content. A step of presenting a candidate retail offer for the distribution of the content to the consumer and receiving a request from the consumer to exercise the candidate retail offer. Finally, validating the candidate retail offer for the distribution of the content by accessing the electronic contract and determining if the candidate retail offer is consistent with the electronic contract. Upon successful validation, providing the content to the consumer, receiving compensation information from the consumer indicating at least the amount of compensation for the content provided and allocating the compensation according to the electronic contract.

21 Claims, 14 Drawing Sheets

U.S. PATENT DOCUMENTS

| | | | |
|---|---|---|---|
| 5,732,400 | A | 3/1998 | Mandler et al. |
| 5,734,719 | A | 3/1998 | Tsevdos et al. |
| 5,745,879 | A | 4/1998 | Wyman |
| 5,793,980 | A | 8/1998 | Glaser et al. |
| 5,809,145 | A | 9/1998 | Slik et al. |
| 5,825,876 | A | 10/1998 | Peterson |
| 5,889,860 | A | 3/1999 | Eller et al. |
| 5,892,900 | A | 4/1999 | Ginter et al. |
| 5,895,454 | A | 4/1999 | Harrington |
| 5,910,987 | A | 6/1999 | Ginter et al. |
| 5,915,019 | A | 6/1999 | Ginter et al. |
| 5,917,912 | A | 6/1999 | Ginter et al. |
| 5,918,213 | A | 6/1999 | Bernard et al. |
| 5,920,861 | A | 7/1999 | Hall et al. |
| 5,943,422 | A | 8/1999 | Van Wie et al. |
| 5,947,746 | A | 9/1999 | Tsai et al. |
| 5,949,876 | A | 9/1999 | Ginter et al. |
| 5,953,005 | A | 9/1999 | Liu |
| 5,959,945 | A | 9/1999 | Kleiman |
| 5,963,916 | A | 10/1999 | Kaplan |
| 5,969,283 | A | 10/1999 | Looney et al. |
| 5,982,891 | A | 11/1999 | Ginter et al. |
| 5,987,525 | A | 11/1999 | Roberts et al. |
| 6,009,401 | A | 12/1999 | Horstmann |
| 6,011,761 | A | 1/2000 | Inoue |
| 6,012,086 | A | 1/2000 | Lowell |
| 6,083,009 | A | 7/2000 | Kim et al. |
| 6,092,049 | A | 7/2000 | Chislenko et al. |
| 6,161,137 | A | 12/2000 | Ogdon et al. |
| 6,167,567 | A | 12/2000 | Chiles et al. |
| 6,182,125 | B1 | 1/2001 | Borelia et al. |
| 6,185,602 | B1 | 2/2001 | Bayrakeri |
| 6,199,096 | B1 | 3/2001 | Mirashrafi et al. |
| 6,226,618 | B1 | 5/2001 | Downs et al. |
| 6,314,409 | B2 | 11/2001 | Schneck et al. |
| 6,385,596 | B1 | 5/2002 | Wiser et al. |
| 6,519,700 | B1 * | 2/2003 | Ram et al. ............ 713/193 |
| 6,754,904 | B1 | 6/2004 | Cooper et al. |
| 2002/0103824 | A1 | 8/2002 | Koppolu et al. |

FOREIGN PATENT DOCUMENTS

| | | |
|---|---|---|
| EP | 0 593 384 | 4/1994 |
| EP | 0 834 798 | 4/1998 |
| EP | 000471639 A2 | 2/2002 |
| JP | 08-314483 | 11/1996 |
| JP | 09-214540 | 8/1997 |
| JP | 10-124586 | 5/1998 |
| JP | 10-200656 | 7/1998 |
| JP | 10-228407 | 8/1998 |
| JP | 10-257468 | 9/1998 |
| JP | 10-262231 | 9/1998 |
| JP | 10-275186 | 10/1998 |
| JP | 10-293769 | 11/1998 |
| JP | 10-302150 | 11/1998 |
| JP | 10-307592 | 11/1998 |
| JP | 10-333769 | 12/1998 |
| WO | WO97/43761 | 11/1997 |
| WO | WO98/10381 | 3/1998 |
| WO | WO98/37481 | 8/1998 |
| WO | WO-98/49643 | 11/1998 |
| WO | WO99/24928 | 5/1999 |
| WO | WO99/48296 | 9/1999 |

OTHER PUBLICATIONS

Content Reference Forum Introduction: Mar. 17, 2003; www.crforum.org/crfeppub/CRF004_02_cr_forum_overview.pdf.

The Digital Object Identifier Initiative: Aug. 1988; www.doi.org.

Copyright in the Digital Era: Janet Balas, Computer Libraries; Jun. 1998, vol. 18, No. 6.

The Digital Object Identifier System, Dec. 15, 1997; www.doi.org.

The DOI Vision, DOI Technology Forum, Bill Rosenblatt; Dec. 10, 1997.

Handle System: DOI Technical Infrastructure, Larry Lannom, Dec. 10, 1997.

Digital Object Identifier Technology Forum, Constance McLindon; Dec. 10, 1997.

DOI Technology Forum, Carl Risher, Dec. 10, 1997.

Liquid Audio: Internet Archive Wayback Machine, www.archive.org; liquidaudio.com; Oct. 10, 1997.

Handle Resolution Protocal Specification, Corporation for National Research Initiatives, Feb. 18, 1997.

An Architecure for Information in Digital Libraries, Arms et al., D-Lib Magazine, Feb. 1997.

Uniform Resource Names, Arms et al., D-Lib Magazine, Feb. 1996.

A Framework for Disributed Digital Object Services, Kahn et al., Corporation for National Research Initiatives, May 13, 1995.

Supplemental European Search Report, European Patent Application No. 999676000.0, dated Jul. 8, 2005.

van Halteren Aart T. et al., "Value Added Web: Integrating WWW with a TINA Service Management platform", pp. 14-23 (1999).

Tothezan, Ionel, et al., "Enterprise Modelling of Information Brokerage and Retailer Services", Architecture for Information Brokerage Services, CEC project AC206, pp. 13-22 (1997).

A new set of rules for information commerce—Rights-protection technologies and personalized-information commerce will affect all knowledge workers, Smith, Mary Grace, Communications Week, Nov. 6, 1995, pp. 34-41.

* cited by examiner

ELECTRONIC MUSIC/MEDIA DISTRIBUTION SYSTEM

CROSS-REFERENCE TO RELATED APPLICATIONS

This application is a Continuation-In-Part of:

U.S. application Ser. No. 09/471,971 filed Dec. 23, 1999 now U.S. Pat. No. 7,209,892 which claims priority pursuant to 35 U.S.C. §119 from Provisional Patent Application Ser. No. 60/113,861 filed Dec. 24, 1998;

U.S. application Ser. No. 09/486,759 filed Jun. 8, 2000 now abandoned which claims priority pursuant to 35 U.S.C. §119 from Provisional Patent Application Ser. No. 60/116,555 filed Jan. 21, 1999; and U.S. application Ser. No. 09/614,106 filed Jul. 12, 2000 now abandoned which claims priority pursuant to 35 U.S.C. § 119 from Provisional Patent Application Ser. No. 60/143,283 filed Jul. 12, 1999.

The entire disclosures of all applications are hereby incorporated by reference.

FIELD OF THE INVENTION

The present invention relates to the electronic distribution of media through a network, and in particular transmitting information specifying particular media or portions of media in order to govern and synchronize the rendition of such media where the distribution is controlled by electronic contracts and business rules.

BACKGROUND OF THE INVENTION

There are various market participants that engage in buying, selling, finding and distributing content. Content owners typically own the copyright in the content and can distribute the content directly to consumers or can negotiate with distributors and/or retailers to allow them to distribute the content to the consumer. Distributors are typically 'middle-men' and contract with the content owners to distribute the content for the content owners. Distributors typically sell the content to the retailers. Retailers are typically the 'shops', whether they are 'brick & mortar' or web based, that sell the content to the consumer. Retailers contract with the distributor to obtain rights to market, sell, and distribute media to consumers The interrelation between these parties is sometimes known as a 'value chain', i.e., the content can be created by the owner, distributed by the distributor, sold by the retailer and purchased by the consumer. The price paid by the consumer then must "travel" back up the value chain to compensate each party for the sale. Other participants in the value chain having an interest in the media being created, distributed or consumed, include one or more of the following: the artist, the software player vendor, the device manufacturer or licensor, the patent holder, network providers, internet service providers, websites, clubs and the like.

In the content industries, content such as music, video, text (books, articles, e-magazines) and data (software) has been sold to consumers by retailers for years on various media including compact discs (CDs, CD-R), video and audio tapes (VHS, DAT) and digital video/versatile disk (DVD) sold at retail stores. The content owners, distributors, and retailers have contracts between them to divide the compensation between the parties. These contracts are negotiated in advance of offering the product and are typically static, i.e. the terms are pre-set and do not change unless the contract is renegotiated.

With the advent of the Internet, various consumer products, including content, are marketed and sold over the Internet. One version of an Internet transaction is where the financial transaction is handled electronically but the product is physically delivered by some other means such as the postal service or a private carrier. The consumer may purchase content from a retailer using a retailer's web site and receive the content in the mail. Once the consumer receives the physical content, having purchased it, the retailer and content owner have lost control over that content in that, for example, the music may be copied but no further payment or royalties are collectable.

Another version of an Internet transaction is that the content is also available on the Internet for consumers to access without purchasing. For example, music and video are transmitted over the Internet, played at the consumer's computer by a software application such as Real-Player but the content is not resident at the consumer's computer. The consumer does not own, retain and cannot replay the content without accessing the source through the Internet. The source retains control over the content.

A third version of an Internet transaction is that consumers can find, purchase and receive content completely over the Internet in a way comparable to conventional purchasing at a retail store that also offers alternatives to purchasing, such as renting music. The consumer accesses the retailer's web page, selects the particular piece of content, purchases it and the content is downloaded directly to the consumer's computer.

Internet technology also affords users across the globe the ability to communicate, e.g., by electronic mail. The sender types or otherwise inputs a message into their personal computer and directs the message to a recipient. An application on the sender's computer establishes communication with a server connected to the Internet and transmits the message. The message may be sent from one server to another depending on the recipient's address. Finally, the destination server transmits the message to the recipient's personal computer. The message may include any electronic data ranging from simple text to complex audio-video material. The entire process can be completed in a very short time.

With appropriate applications, such as ICQ and AOL's Instant Messaging and depending on network traffic and performance, the communication can be so fast as to seem instantaneous to the users participating in the communication. This is achieved by transmitting the message as it is being inputted rather than waiting for the complete message to be input and then sending it. The basic requirement for this type of communication is that both of the users have activated access to the Internet (i.e. both users must be logged on to the network). In addition, the message is usually limited to textual data. To the users, the effect is real-time dialog using electronic data. This system is referred to as Instant Messaging.

An extension of direct communication between the sender and a specific recipient or group of named recipients is dynamic group communication. This system, referred to as Chat, is a conversation among several users where participants can join or leave the conversation at any time. Chat groups may be open to the public or restricted, e.g., limited to persons with a password.

The content industry allows consumers to purchase content over the Internet using complex back-office systems, as stated above. One of the features that enables electronic commerce of content over the Internet to be profitable, is the continued control over the content after its delivered to the consumer. In addition, there are potentially many parties in the value chain having an ownership or financial interest in the content, or the distribution or consumption of the content, and each party's interest must be reliably tracked.

Given the complexity of the transactions and the advances in Internet communication, there is a need for a system and method of tracking and protecting the ownership or financial interests of all parties involved that is conducive to electronic commerce for the application of advanced communication to the sale of content. What is further needed is a system that transmits data sequentially but also has synchronization capabilities so that users in different locations can experience the same media at the same time. The present invention satisfies these and other needs.

SUMMARY OF THE INVENTION

An Internet based content distribution system provides the infrastructure and support for various value chain participants to engage in buying, selling, finding and distributing music. The system provides an interface for consumers to locate, access, and receive musical content over the Internet. The system facilitates continued control over the musical content sent to consumers. The system also provides a service to retailers, distributors, and content owners in assisting with the management of sales and distribution of music over the Internet. The system architecture includes eight modules: Production System, Retail Web Site, Consumer Player, Reference Service, Delivery Service, Content Catalog, Registration Manager, and Financial Clearinghouse. Each of the modules performs a specific set of related functions while communicating with other modules through specified standard interfaces. The communication interfaces provide a great deal of flexibility in the implementation details of the individual modules.

The modules are defined such that multiple or different implementations of each of the modules can be supported within the standard interfaces. The system receives content in various formats and from various sources, formats and then stores the content at the Delivery Service module. In addition, the production system sends select information to the various modules requiring some information about the piece of content. For example, descriptions of the content are sent to the Content Catalog to form a basis upon which consumers may search for content. Similarly, a reference to each item of content is sent to Reference Service so that it may facilitate the retrieval of content from the Production System upon request from a retailer or consumer.

In addition to preparing content, the Production System generates and maintains a Content Catalog of all the content elements. The Content Catalog is a searchable database containing descriptions of each item of content. The Content Catalog may be searched by consumers and retailers.

Once the consumer determines the content they wish to purchase, they select an offer from the selection of offers available through the retailer operating the Retail Web Site. The Consumer Player software package also enforces the terms of any associated offer as the consumer uses the content by only allowing such use as is consistent with the acquired offer. Once the consumer is ready to receive the selected content, the Reference Service instructs the Delivery Service to commence the download of the content to the consumer's Consumer Player. The Delivery Service retrieves the content from its database and sends it to the Consumer Player at the consumer's terminal.

The Consumer Player receives the content and when the user is ready to complete the purchase or use the content, the Consumer Player interacts with the system to ensure compliance with the terms of the offer from the retailer. Payments are processed through the Financial Clearinghouse which interacts with the Consumer Player. For example, if the consumer selected a pay-per-use offer and the deferred payment model was applied, the Consumer Player will track when the consumer plays the music, and generate a micro transaction for that usage. The micro transactions are aggregated and sent to the clearinghouse for accounting and reconciliation. The Financial Clearinghouse also handles the transactions with the consumer's credit card account. In addition, the Financial Clearinghouse credits the value chain participants, including the retailer, distributor, and content owner (e.g., royalties), where appropriate.

The content distribution system as described above has additional features. The system can dynamically enforce retailer agreements and restrictions governing the purchase, use, and distribution of the content. Specifically, the system of the present invention provides a designated module for certifying and distributing retail offers for the content where the offers are dynamically updated by electronic contracts between the retailers, distributors, and content owners. To do this the system maintains the content in secure or tamper resistant format independent and separate from offers which are also in secure or tamper resistant format.

An electronic contract represents an agreement between two or more entities, typically the retailer and distributor. A variety of electronic contracts may be implemented by the system. A "distributor-retailer distribution contract" sets forth the terms and conditions under which the retailer may distribute content to consumers. A "distributor-retailer financial contract" sets forth the terms and conditions under which the retailer and the distributor are compensated for the distribution of the content. Other contracts cover variations of these two distribution and financial contracts. For example, contracts may cover agreements between a distributor and a group of retailers instead of individual contracts for each retailer. In addition, contracts may, for example, cover a specific selection of content, e.g., content produced during a specified period or by a certain artist.

In applying the rules, the system considers any contract or rules pertaining to the distributor, retailer, and content taking part in the proposed transaction. If there is more than one relevant contract or rule, and an inconsistency is posed, it is resolved by applying the more specific terms rather than the broader terms.

An embodiment is described with reference to offers created by the retailer. It should be understood that other members of the distribution chain and/or consumption chain may create offers or be affected by offers. For example, a software development company or a cable network company may participate in the creation of offers independently or in conjunction with a retailer or distributor. Another example where other parties may be involved in the offers and receive a subsequent benefit of royalties is super-distribution where a consumer distributes content to other consumers.

A candidate retail offer is packaged and may exist separately from the content. The candidate retail offer is delivered to the consumer separately from the content and is "combined" with the content at the point of purchase, i.e., at the consumer's Consumer Player. Only the default offer remains with the content at all times. As there are multiple retailers, a consumer can download multiple candidate retail offers for the same content. Which of the valid certified retail offers actually gets exercised is at the consumer's discretion.

An offer can include a content reference (or handle, as described below) and the content is actually delivered independently at a later time. Multiple Retail Offers can be associated with a piece of content and vice versa.

In the rare instance that there is a reference to content but the content does not exist or has been removed from the database of content maintained by the system, the Delivery Service can access a handle in the reference and determine where the content can be acquired from.

Handles referring to content (described in detail below) or the content itself may be super distributed. Each time that they are super distributed, a counter in the handle can be incremented. Whether or not a retailer participates in the value chain of a super distributed sale depends on how many (if any) super distributions are specified in the contract between the distributor and the retailer. The above dynamic system, in a preferable embodiment, can be used to assist in the distribution of content using content references or handles.

Content transport requires a balance of bandwidth and time to get it to consumers. In addition, storage of content requires significant resources if it is to be kept by the consumer. The solution to this challenge is to separate descriptive information from the content itself, a content reference (handle). Thus, instead of transmitting the content, only a reference to the content is transmitted. When the user receives the reference, the user can access the content directly.

Content references provide a mechanism used by consumers, or any other party in the value chain, to receive, save, and share content identification information and to send it to other consumers without having to move large binary files around. A content reference can be thought of as an address or pointer to content and is the mechanism to refer to content indirectly. A content reference contains a small amount of descriptive information about a piece of content. This descriptive information contains sufficient information to allow a consumer with a Consumer Player to determine what the content is and how to get to the content, but does not contain the actual content.

Handles are references to content, not to the location of the content. Content stored on a server or other device connected to the network is accessible by specifying a content reference using an application appropriate for the network. The content reference along with supplementary information is packaged in a data structure called a handle to facilitate rendition of the content. A handle may be sent to another consumer by E-mail, Chat, Instant Messaging, Cell Phone protocols or TV/Video links. When the recipient is ready to render the content referenced by the handle, the recipient accesses the handle and activates the appropriate software application such as Consumer Player. The handle contains all the information needed to download the content, and if applicable complete any commercial transactions pertaining to the use of the content. Specifically, the handle can include information identifying each participant in the value chain, i.e., any entity that participated in the creation, resolution or transmission of the content that might receive some compensation for their participation.

In comparison the handle is not a Universal Resource Identifier ("URI"). A URI typically consists of the name of the machine hosting the content, the name of the content, and a path to the content. A typical URI may be read as follows, there is a document available [name] residing on [computer name] and accessible via [path descriptor]. Thus, a URI specifically identifies the location (path) of the electronic content. This is in contrast to a handle.

DETAILED DESCRIPTION OF THE INVENTION

Figure 1:
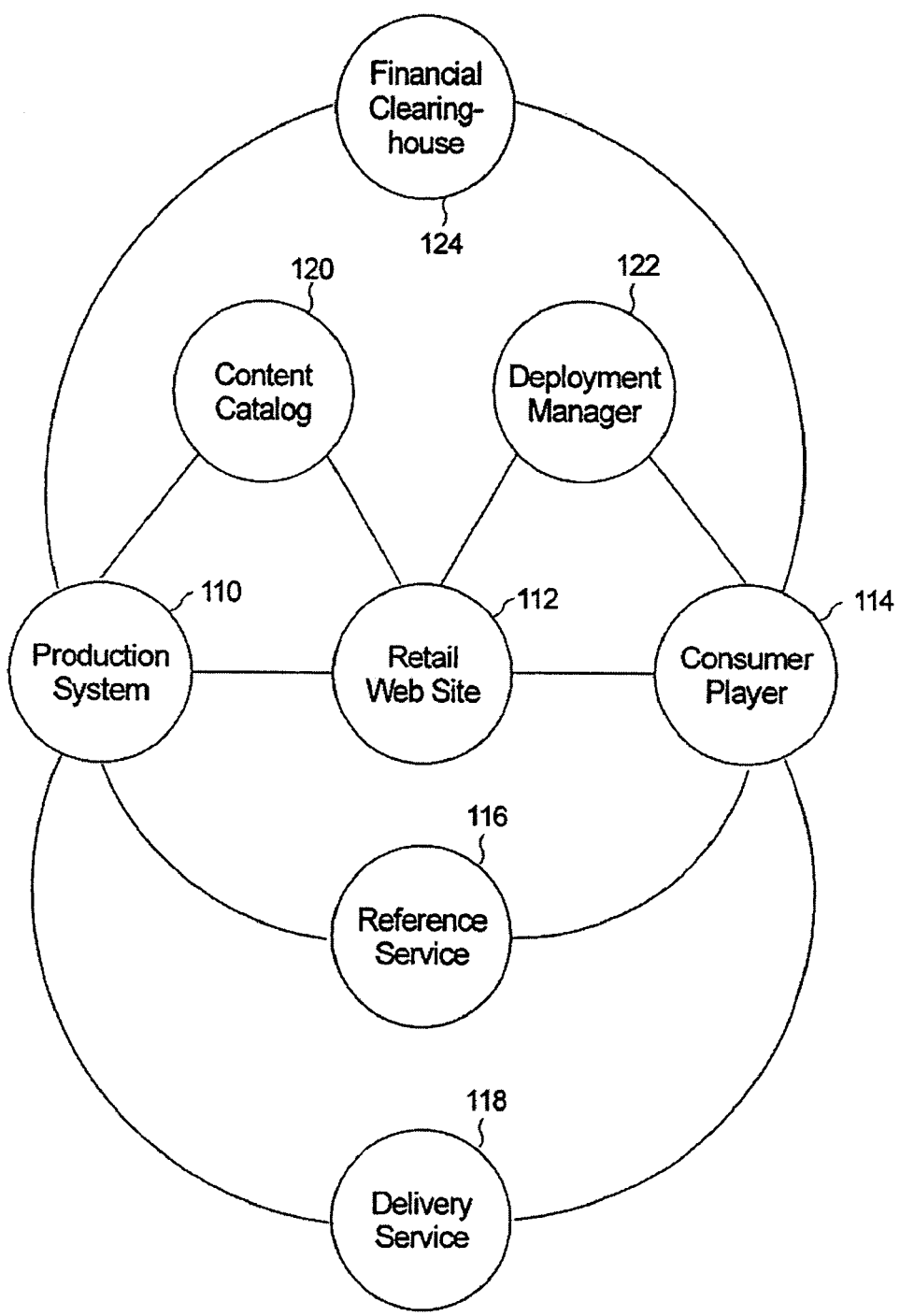
FIG. 1 illustrates a block diagram of an arrangement of modules for implementing the present invention.

An Internet based content distribution system is disclosed in application Ser. No. 09/471,971 that provides the infrastructure and support for various value chain participants to engage in buying, selling, finding and distributing music. The system provides an interface for consumers to locate, access, and receive musical content over the Internet. The system facilitates continued control over the musical content sent to consumers. The system also provides a service to retailers, distributors, and content owners in assisting with the management of sales and distribution of music over the Internet. The system architecture includes eight modules, as illustrated in FIG. 1: Production System, Retail Web Site, Consumer Player, Reference Service, Delivery Service, Content Catalog, Registration Manager, and Financial Clearinghouse. Each of the modules performs a specific set of related functions while communicating with other modules through specified standard interfaces. The communication interfaces provide a great deal of flexibility in the implementation details of the individual modules. The modules are defined such that multiple or different implementations of each of the modules can be supported within the standard interfaces.

Production System 110 maintains all of the content and sends the content to the Delivery Service for storage. Production System 110 also assists retailers in maintaining their web sites. Retail Web Sites 112 are web sites of retailers who subscribe to or contract with distributors and provide an environment for consumers to access and purchase content over the Internet. Consumer Player 114 enables consumers to interact with the system to directly download and purchase content from the Retail Web Site and play and store the content locally while enforcing the rules governing the purchase arrangement. Reference Service 116 provides the mechanism for consumers to purchase the content. Delivery Service 118 downloads the actual content and associated rules from its database to the Consumer Player. Content Catalog 120 is a database optimized for quickly finding the content based on a constrained set of attributes and can be accessed via a query function implemented at the Retail Web Sites. Registration Manager 122 downloads the Consumer Player for the consumer the first time the consumer uses the system and maintains the system's security on an ongoing basis. Financial Clearinghouse 124 manages the complete purchase by performing payment processing for certain transactions and manages purchase reporting and settlement of other transactions where the actual purchase is processes by the Consumer Player.

The system receives content in various formats and from various sources, formats and then stores the content at the Delivery Service module. In addition, the production system sends select information to the various modules requiring some information about the piece of content. For example, descriptions of the content are sent to the Content Catalog to form a basis upon which consumers may search for content. Similarly, a reference to each item of content is sent to Reference Service so that it may facilitate the retrieval of content from the Production System upon request from a retailer or consumer.

In addition to preparing content, the Production System generates and maintains a Content Catalog of all the content elements. The Content Catalog is a searchable database containing descriptions of each item of content. The Content Catalog may be searched by consumers and retailers.

Once the consumer determines the content they wish to purchase, they select an offer from the selection of offers available through the retailer operating the Retail Web Site. In order to receive and use the content, the consumer must be equipped with the Consumer Player software. If the consumer does not already have the Consumer Player, then the Retail Web Site requests the Registration Manager to download and activate the software on the consumer's personal computer. The Consumer Player software package also enforces the terms of any associated offer as the consumer uses the content by only allowing such use as is consistent with the acquired offer. Once the consumer is ready to receive the selected content, the Reference Service instructs the Delivery Service to commence the download of the content to the consumer's Consumer Player. The Delivery Service retrieves the content from its database and sends it to the Consumer Player at the consumer's terminal. The Consumer Player receives the content and when the user is ready to complete the purchase or use the content, the Consumer Player interacts with the system to ensure compliance with the terms of the offer from the retailer.

There are many ways in which a consumer can purchase the products received. These include the contract model and the deferred model. The contract model is where the consumer contemporaneously pays for and receives the content and the retailer receives the payment. The deferred model is where the content is transferred to the consumer prior to any financial transaction with the retailer. In this latter scenario, the consumer acquires the offer and content through the retail web site but defers purchasing the music. When the consumer is ready to complete the transaction, the payment is made, the transaction is reported to the retailer and the retailer is paid.

Payments are processed through the Financial Clearinghouse which interacts with the Consumer Player. For example, if the consumer selected a pay-per-use offer and the deferred payment model was applied, the Consumer Player will track when the consumer plays the music, and generate a micro transaction for that usage. The micro transactions are aggregated and sent to the clearinghouse for accounting and reconciliation.

The Financial Clearinghouse also handles the transactions with the consumer's credit card account. In addition, the Financial Clearinghouse credits the value chain participants, including the retailer, distributor, and content owner (e.g., royalties), where appropriate.

The content distribution system as described above has additional features as described in application Ser. No. 09/471,971. The system can dynamically enforce retailer agreements and restrictions governing the purchase, use, and distribution of the content. Specifically, the system of the present invention provides a designated module for certifying and distributing retail offers for the content where the offers are dynamically updated by electronic contracts between the retailers, distributors, and content owners. To do this the system maintains the content in secure or tamper resistant format independent and separate from offers which are also in secure or tamper resistant format.

A content owner and/or distributor assembles content (including some or all of the audio, video, image and text), encodes and formats them to conform with system requirements. The content owner and/or distributor creates and electronically encodes business rules for how the content can be distributed and consumed, facilitating the delivery of the content. The relevant terms and conditions of distribution are in the form of electronic contracts and/or business rules. The electronic contract may be viewed conceptually as an equation governing the relationship between certain parties or entities. The specific values for the variables in the equation are determined according to each particular circumstance in order to create the specific electronic contract or relationship for that circumstance. The typical entities having an interest in the content are the value chain participants.

An electronic contract represents an agreement between two or more entities, typically the retailer and distributor. A variety of electronic contracts may be implemented by the system. A "distributor-retailer distribution contract" sets forth the terms and conditions under which the retailer may distribute content to consumers. A "distributor-retailer financial contract" sets forth the terms and conditions under which the retailer and the distributor are compensated for the distribution of the content. Other contracts cover variations of these two distribution and financial contracts. For example, contracts may cover agreements between a distributor and a group of retailers instead of individual contracts for each retailer. In addition, contracts may, for example, cover a specific selection of content, e.g., content produced during a specified period or by a certain artist.

Business rules set forth the distributor's (or content owner's) terms governing the distribution of specific content independent of any contracts between the parties. "General content distribution rules" include rules for distributing a specific unit of content, i.e., a content element, and are packaged with the content ready to be distributed to a consumer. "General distribution rules" include rules for distributing content not otherwise covered by some rule or contract. "Suggested business rules" represent suggested conditions, including, for example, price ranges for certain transactions.

In applying the rules, the system considers any contract or rules pertaining to the distributor, retailer, and content taking part in the proposed transaction. If there is more than one relevant contract or rule, and an inconsistency is posed, it is resolved by applying the more specific terms rather than the broader terms.

Examples of such rules are "This content can only be sold in Country X", "This content can be purchased outright or offered as pay-per-play but not rented", etc. These rules are included in the Rights data enclosed with the content. When a retailer creates an offer for content available on its web site, the retailer is limited by the distributor's rule enclosed with the content. The retailer is also limited by the specific contractual arrangement with the distributor.

The distributor also creates a default offer for the content and the default offer is included in the Rights data. A default offer provides actual commercial terms for consumers to acquire the content, and may be included with the content where the distributor is also acting as the retailer. A default offer may have no expiration date, i.e., it is valid in perpetuity. The distributor may set prices in the default offer as a function of time. Alternatively, the default prices may be updated periodically or on-demand when the consumer is ready to "consume" the content. The default offer may also be used as a template by retailers assisting in the creation of retail offers.

A retailer can create unique retail offers on available content subject to its contracts with the distributors and subject to the business rules associated with the specific content. A Retail Offer includes rules governing how consumers can acquire rights to the content under certain conditions, including validity period, payment, type of consumption (unlimited use, N plays, time-limited plays, etc.). Both "markup" (retailer adds $X to the wholesale price) and "commission" (retailer is paid X % of the retail price) models may be exercised. Offers can be "contract" or "deferred". Contract Offers (C-Offers) require payment prior to downloading of the content, while Deferred Offers require payment on consumption. The rules are packaged securely to prevent tampering and fraud.

The preferred embodiment is described with reference to offers created by the retailer. It should be understood that other members of the distribution chain and/or consumption chain may create offers or be affected by offers. For example, a software development company or a cable network company may participate in the creation of offers independently or in conjunction with a retailer or distributor. Another example where other parties may be involved in the offers and receive a subsequent benefit of royalties is super-distribution where a consumer distributes content to other consumers.

A candidate retail offer is packaged and may exist separately from the content. The candidate retail offer is delivered to the consumer separately from the content and is "combined" with the content at the point of purchase, i.e., at the consumer's Consumer Player. Only the default offer remains with the content at all times. As there are multiple retailers, a consumer can download multiple candidate retail offers for the same content. Which of the valid certified retail offers actually gets exercised is at the consumer's discretion.

Retail offers uniquely identify the retailer and the content that is subject to the retail offer. The candidate retail offer is checked for validity and certified and is placed on the retailer's web site so that it is made available to consumers.

Figure 2:
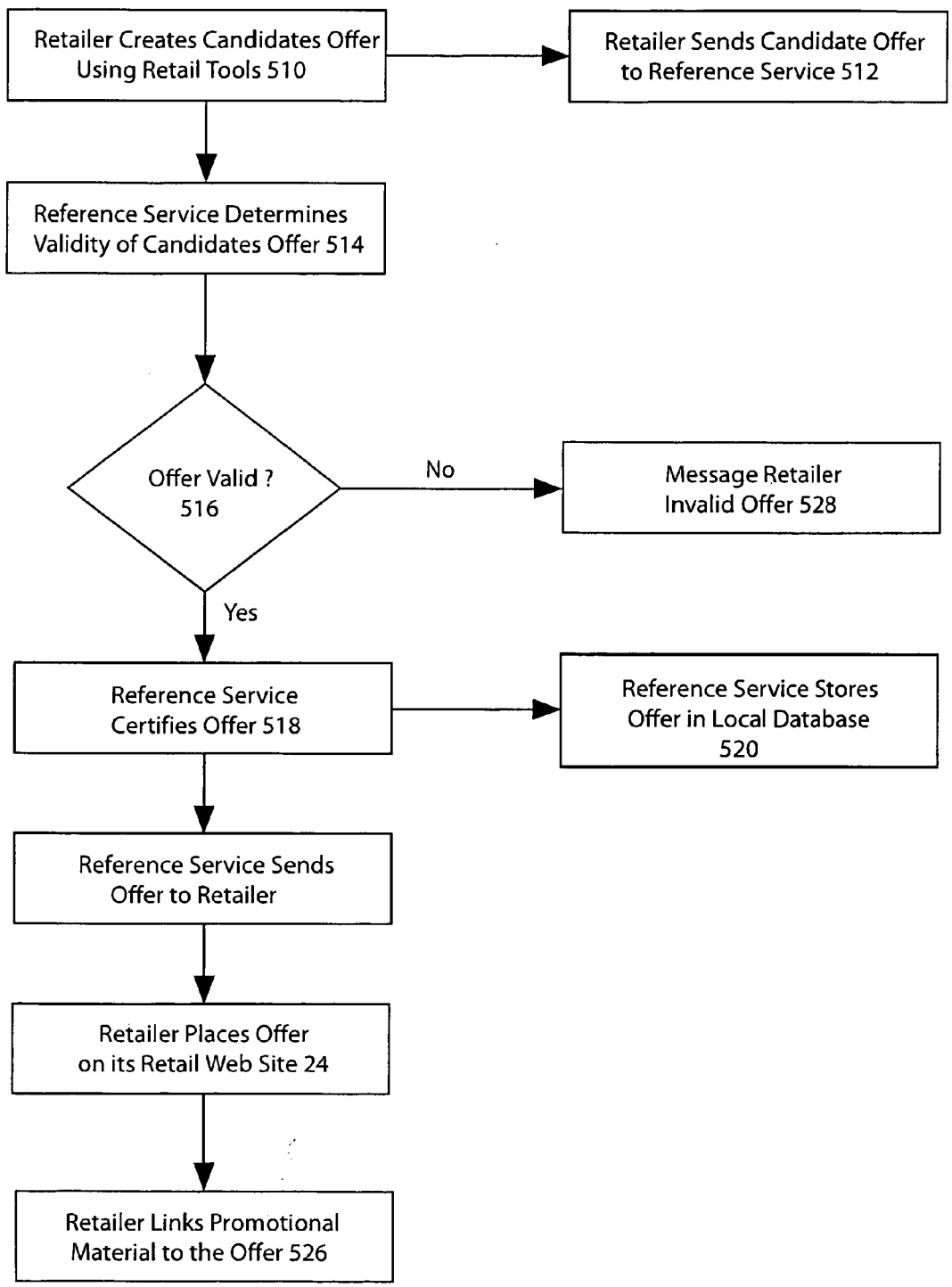
FIG. 2 is a flow chart showing a method for creating an offer in accordance with an embodiment.

Referring to FIG. 2, the first step in creating an offer for consumers to acquire content is that the retailer creates a candidate retail offer (step 510). The candidate retail offer is an offer proposed by the retailer for the distributor's certification. The retailer next sends the candidate retail offer to the Reference Service for validation (step 512). The Reference Service determines the validity of the candidate retail offer (step 514). If the offer is valid the Reference Service certifies the offer (step 518) and stores it locally (step 520). In addition, the Reference Service sends the certified offer back to the retailer (step 522). The retailer may then place the offer on its Retail Web Site (step 524) and optionally, link promotional material to the offer (step 526). However, if the candidate retail offer could not be certified because, for example, it failed to comply with a distributor's requirement, the Reference Service returns a message to the retailer informing it that the candidate retail offer was not valid (step 528). The retailer can create multiple or different offers for the same content. The retailer or consumer may specify whether the offer is for a "contract" transaction or "deferred" transaction. The contract transaction is settled at the time of or prior to distribution and the deferred transaction is settled upon consumption of the content. In the contract transaction, the consumer pays and receives the product. The deferred transaction is settled during or after the consumption by a compliant Financial Clearinghouse. The immediate transaction may be between the consumer and the Consumer Player, subject to the consumer's available budget and the content's rules, eventually to be reported to and audited by a Financial Clearinghouse.

Alternately, the candidate retail offer for the distribution of the content can be presented to the consumer prior to validation. When the consumer the requests to exercise the candidate retail offer, it can then be validated as below.

In order to become valid, the candidate retail offer needs to be certified by the distributor/content owner whose content is being offered. If the offer specifically refers to content from multiple distributors, all of them need to certify it. The network of Reference Services (RS's) may perform this process transparently (i.e. either without the knowledge of or without notifying) to the retailer, for example, RS1 sends the candidate offer to RS2 for signature, RS2 sends it to RS3, RS3 signs and return to RS1.

The Reference Service validates the candidate retail offer and creates a certified retail offer. The Reference Service checks the candidate retail offer against the E-contract and the content-specific business rules. If the offer is consistent with the offer and the rules, it is electronically certified. The term "certification" as used here means ensuring that any subsequent modification of the offer may be detected. It does not imply any specific technology—RMS-based, token-based, digital signature, digital certificate, combination of signature and certificate, etc.

If the offer includes content from a number of content owners, multiple Reference Services may need to certify it. This may be implemented, for example, by the first Reference Service being responsible for contacting the others and collecting their signatures/certificates.

The Reference Service returns the certified retail offer to the retailer, who in turn places the certified retail offer on its web site. How the certified retail offer is incorporated into the retailer's web site is at the retailer's discretion.

The retailers will typically not be allowed to make offers in perpetuity, i.e., Retail Offers will generally have an expiration date. The allowed duration of the offers can be determined by the contract between the retailer and the distributor and by content-specific business rules. However, retailers can renew it retail offers upon request. For the cases where the retailer wants to renew an offer without any changes, this may be implemented automatically.

In addition to the Rules for use of content there are Business Rules Objects which define how the content can be processed and transacted upon within the system. There can be multiple layers of rules to reflect the complexity of business relationships. The Default Business Rules enable access to content as constrained or allowed by the content owner and/or distributor. The Default Business Rules are generally packaged with the content and each package typically has one and only one set of Default Business Rules directly associated with it. The Default Business Rules can be layered according to the contents' hierarchy of Group Object (GOB) at the highest level, Content object (MOB) at the intermediate level, and Content Element (CEL) at the lowest level. The Default Business Rules will include the default offer which can be described as the "list price" of the content being offered by the distributor. Any time after the consumer receives the content, which is accompanied by a default offer in the typical course of processing, the consumer continues to retain the option of repeated use the content in accordance with the default offer. To support this option for the consumer, the default offer may be used to generate a current price applicable each time the consumer uses the content.

Preferably, an offer can include a content reference (or handle, as described below) and the content is actually delivered independently at a later time. Multiple Retail Offers can be associated with a piece of content and vice versa.

References for the content may take the form of encapsulated files which are processed by the Consumer Players. The content reference can reside anywhere in the system and can be transmitted in super-distribution (e.g., as e-mail attachments). The content reference files generally have "secure areas" to protect against theft or tampering of the enclosed information. Retail Offers are typically carried within the content references in a secure (read only) manner.

One aspect of Offer creation is secure packaging of the assigned Rights, sometimes performed dynamically ("on-the-fly"). Another aspect of offer creation is "synchronization" of various Business Rules associated with the content. For example, the music industry has a complex web of business relationships that requires multiple levels of "Rules"— content owner's, distributor's, and retailers. Within the system the upstream Rules, i.e. those representing the relationship between the distributor and content owner are generally not propagated throughout the system. These "Rules" may be represented as a set of Default Business Rules constraining the content. This may include limitations on the packaging, geography, price levels, time or other constraints. Further, in some countries there may be implications for other "Rights" holders, such as the Performing Rights Societies or Mechanical Rights Societies, to have the distributor act as the collection agent for these rights with the obligation to pay immediately and directly the payments due to these societies. In the system, the rules may be layered to represent the constraints and obligations of each rights holder within differing countries or regulatory regimes. For example, first artist's rules and or any other obligatory rights holders, then distributor's (which jointly comprise the "Default Rules"), as a set of Rules which govern the content.

The various Rules are consistent with each other and discontinuities and disconnects are not created. For example, there should not be a situation where, for example, the Default Rules say "songs in this album are not individually purchasable" while the Retailer Offer says "buy any of the songs in this album for $1.00". The Rules are checked or consistency against the contracts and other information available. In this example, the candidate retail offer would be deemed to be invalid, and as such, rejected.

There are several criteria against which Offer validation is measured. Different subsets of these criteria are checked at different points in the system depending on the particular activity, e.g. Offer certification, Offer validation, invalid Offer resolution, Reference resolution, etc. The following list of offer validation criteria is not exhaustive but is intended to indicate the types of checks that can be performed in the system: Is there a relationship with the Retailer? Is the Retailer allowed to sell the Content? Is the Retailer allowed to sell this Content in the specified manner (outright, rental, one-play)? Is the price within the contractual constraints? Is the expiration date appropriate? Is the payment mechanism appropriate? Is the distribution channel appropriate? Has the contract been revoked (canceled, changed)? Has the Offer been tampered with? Has the Offer been revoked (by distributor or retailer)? Has the referring RMS been designated as suspicious? One of the purposes of the Reference Service is to provide a strong control mechanism to allow the Content Owners to better manage these events.

There are several principal mechanisms for making sure that the candidate retail offers are valid: 1) the Offer creation tool checks for logical consistency between the candidate retail offer and the business rules (e.g., the Default Business Rules) associated with the content, 2) pre-packaged "offer forms" limit the retailer's ability to create rules inconsistencies, and 3) the certification process where the retailers' offers are validated based on distributor-retailer contractual relationships. These mechanisms may be automated in a dynamic environment to be effective. All the mechanisms are interdependent. Relevant Default Business Rules may be available to the retailers during the candidate retail offer creation stage and that, while the Retailers are able to create their candidate retail offers themselves, in order to be "valid" these candidate retail offers have to be certified (against the contractual constraints) by the distributors of the content involved.

The candidate retail offer certification process will be conducted by the Reference Service. Each candidate retail offer which involves content from a specific distributor is securely communicated to the Reference Service of that distributor (Retail Coupons which are not distributor-specific, e.g., "buy 10 items from Retailer X, get free movie tickets", do not have to be certified). The Reference Service verifies that the offer is consistent with the contractual agreements and "signs" the offer. Thus, the Reference Service knows all the currently valid offers (both Retail and Default) for the content it references.

There are two types of objects that require resolution into valid Offers: invalid candidate retail offers and References. As noted above, References identify content and do not contain Offers. Invalid candidate retail offers are effectively a form of References, in that they identify content and do not contain valid candidate retail offers. In both cases, the desired result is that if possible, a content identification object that does not have a valid candidate retail offer is resolved into one that does have a valid candidate retail offer to become a certified retail offer.

The resolution process may be performed by the Reference Service as follows: 1) Determine which retailer created the candidate retail offer or Reference. 2) If there is no longer a relationship with the retailer, provide the Content Owner Default Offer for that piece of content, otherwise determine business rules for resolving References for that retailer. 3) If the business rules allow the Retailer to satisfy the request, provide the candidate retail offer for this content (which at a minimum will be the Default Offer being made on the Retailer's behalf), otherwise provide the Content Owner Default Offer.

When the consumer's RMS detects that a certified retail offer is invalid, typically, the reason for the invalidity is that the certified retail offer has passed its expiration date. In this case if a consumer attempts to use such a certified retail offer and they have the content already on their local machine, the Consumer Player proposes the Default Offer enclosed with the content, or propose to request a valid certified retail offer from the Reference Service. If the consumer does not have the content, then the Reference Service attempts to find the most similar candidate retail offer from the original Retailer if it still has a business relationship with this Retailer. Otherwise, the content may be offered at the "list price" (i.e. the Default Offer) with the distributor acting as a retailer.

A certified retail offer might also be invalid because it has an improper certificate. Generally, such a problem may be caught by the player's RMS, but it may be forwarded to the Reference Service to determine whether there was a transmission error or whether it was a fraudulent attempt.

The certified retail offer may be RMS-valid but not system-valid. A typical situation is where an offer which has not expired but has been revoked because, for example, the underlying contractual conditions have changed. There may be some cost associated with processing of such offers, which may be incurred either on the "front end" by performing an extra validation step or on the "back end" using clearinghouse and customer care. This is perceived as a trade-off area where the most cost-effective approach from the overall business perspective solution may be adopted. The processing is as follows: 1) if a consumer attempts to use such a certified retail offer and they has the associated content on the local machine, the Consumer Player allows the transaction to proceed and the issue may be resolved on the "back end" using clearinghouse and customer care; 2) if a consumer does not have the content locally, the Offer may be validated as a part of the downloading process. If the certified retail offer is determined to be invalid, a replacement candidate retail offer is suggested.

Consumers can find content on the Retail Web Sites and then select a candidate/certified retail offer to purchase the content. The consumer browses the Retail Web Site where the retailer displays various content and content/offer combinations. The consumer can find more offers by clicking on references to content found on the web site. The consumer can also use the query function on the web site to search the Content Catalog for content that is available but not listed individually on the web site. To search the Content Catalog, the consumer enters various keywords that are sent to the Content Catalog module. The Content Catalog will return a list of the content whose description or meta-data matches the keywords from the request. If the consumer does not find the desired content among the search results the consumer can modify the search request and resubmit it to the Content Catalog.

Figure 3:
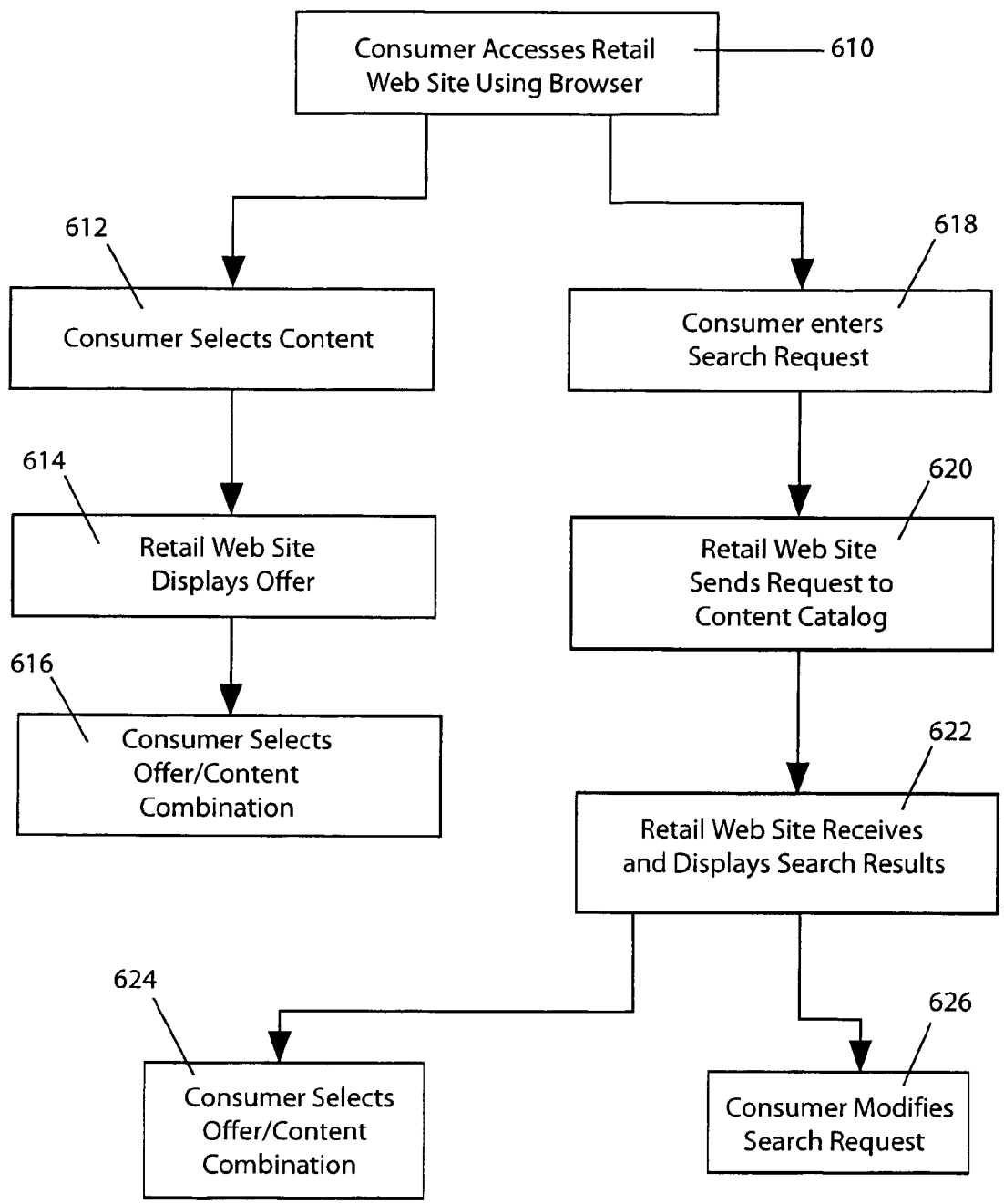
FIG. 3 is a flow chart showing a method for browsing for content in accordance with another embodiment.

Referring to FIG. 3, the consumer can access the Retail Web Site using a conventional Internet browser (step 610). The consumer may select content that is listed on the Retail Web Site (step 612). The Retail Web Site displays certified retail offers for the content selected by the consumer (step 614), thus being offers that were previously certified by the Reference Service. The consumer may then select a certified retail offer for particular content (step 616). The consumer may also search for other content not already displayed on the Retail Web Site. To do this, the consumer enters a search request (step 618) which the Retail Web Site forwards to the Content Catalog (step 620). The Content Catalog searches its database of content descriptions and meta-data, compiles a list of content that satisfies the query terms, and transmits the results to the Retail Web Site. The Retail Web Site receives the resulting list from the Content Catalog and displays it for the consumer (step 622). The consumer may then select a content/offer combination (step 624) or modify their search request to continue looking for content (step 626).

Once the consumer finds content and an offer for the content, the consumer submits a request for the content and the offer at the Retail Web Site. When the consumer selects the content/offer combination, and the consumer does not have a Consumer Player, the Retail Web Site will initiate the Registration Manager to download and activate a Consumer Player at the consumer's personal computer.

Figure 4:
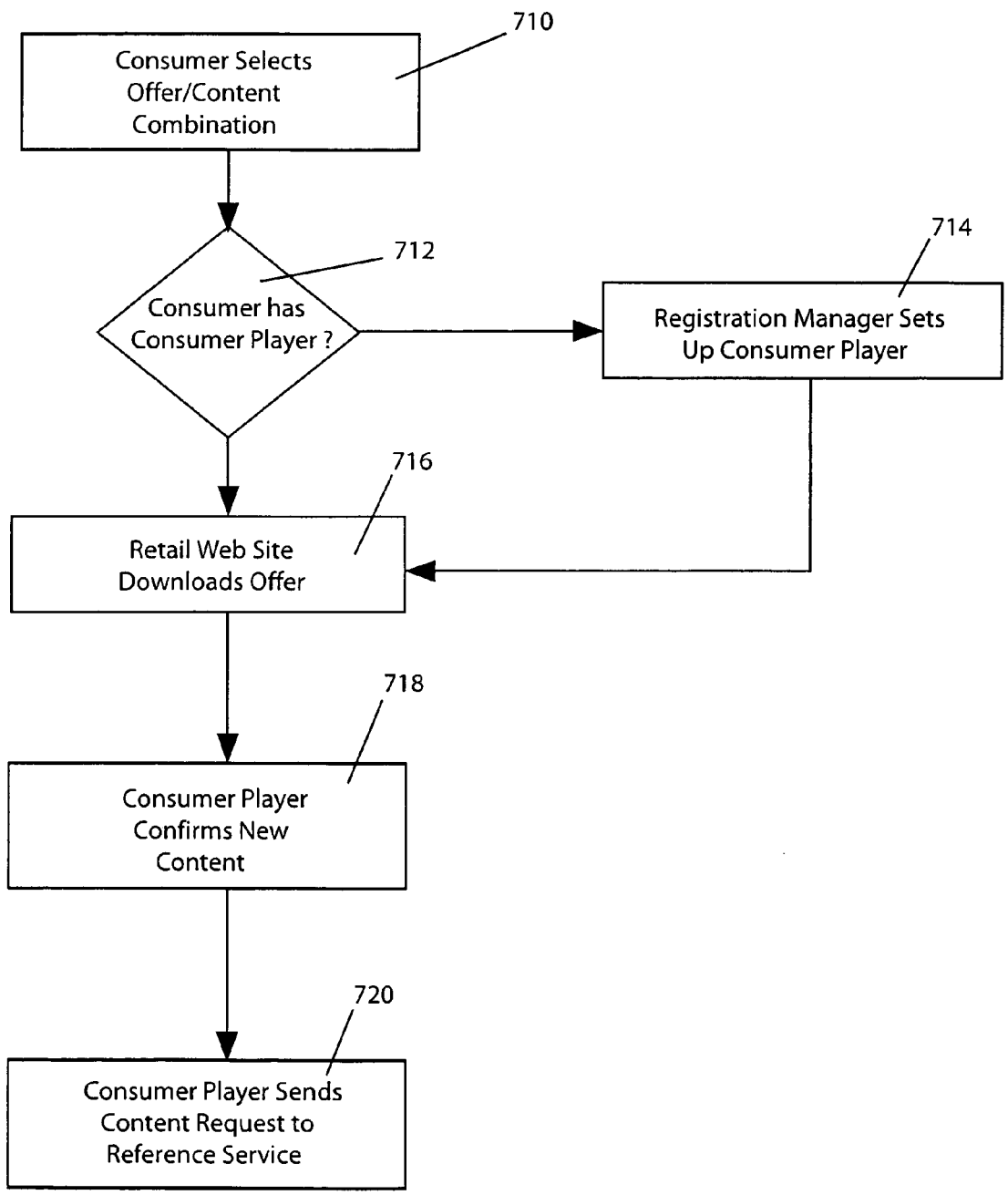
FIG. 4 is a flow chart showing a method for requesting content in accordance with a further embodiment.

Referring to FIG. 4, the consumer selects an offer for particular content (step 710). If the consumer does not have the Consumer Player (software that facilitates the consumer's use of the content), the Registration Manager sets up the Consumer Player (step 714). The Registration Manager downloads the Consumer Player software package to the consumer's personal computer where the software installs itself. After the consumer is provided with the Consumer Player, the Retail Web Site downloads the offer that the consumer selected (step 716). The Consumer Player confirms that the specified content is not already resident at the Consumer Player, i.e. that the content is new to the consumer (step 718). The Consumer Player sends a request to the Reference Service to process the consumer's request for the specified content.

Figure 5:
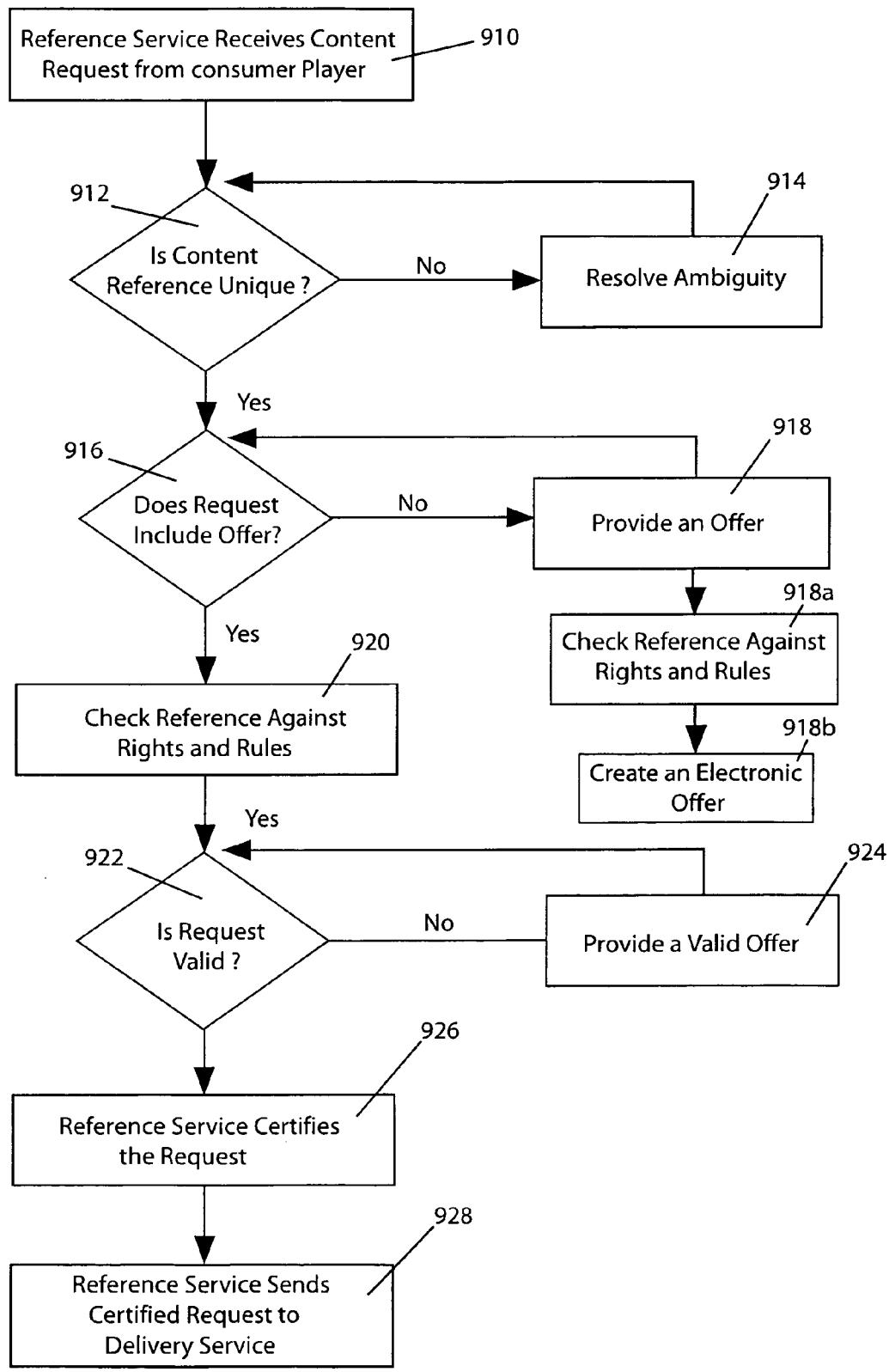
FIG. 5 is a flow chart showing a method for processing a content request in accordance with an embodiment.

Referring to FIG. 5, the Reference Service receives the content and offer combination request from the Consumer Player (step 910). The Reference Service determines whether the reference to the content is unique and unambiguous (step 912). If the content reference is ambiguous, the Reference Service will resolve it according to a predefined business algorithm (step 914). Next, the Reference Service determines whether the request is accompanied by a candidate retail offer (step 916). If a candidate retail offer is not provided, the Reference Service supplies one based on the default rights or offers associated with the content requested (step 918). Next, the Reference Service checks the candidate retail offer against the rights associated with the content and against the business rules for the retailer to determine whether the candidate retail offer is valid (step 920). If the candidate retail offer is not valid, the Reference Service attempts to correct any problem that may arise and provide an alternative candidate retail offer if necessary (step 922). The Reference Service then certifies the candidate retail offer (step 924) and sends the certified retail offer to Delivery Service (step 926). Alternately, in providing an offer (step 918), the new offer is checked against the rights associated with the content and against the business rules for the retailer to determine whether the new offer is valid (step 918a). The new offer is created based on the terms of the electronic contract and/or default rules (step 918b).

Figure 6:
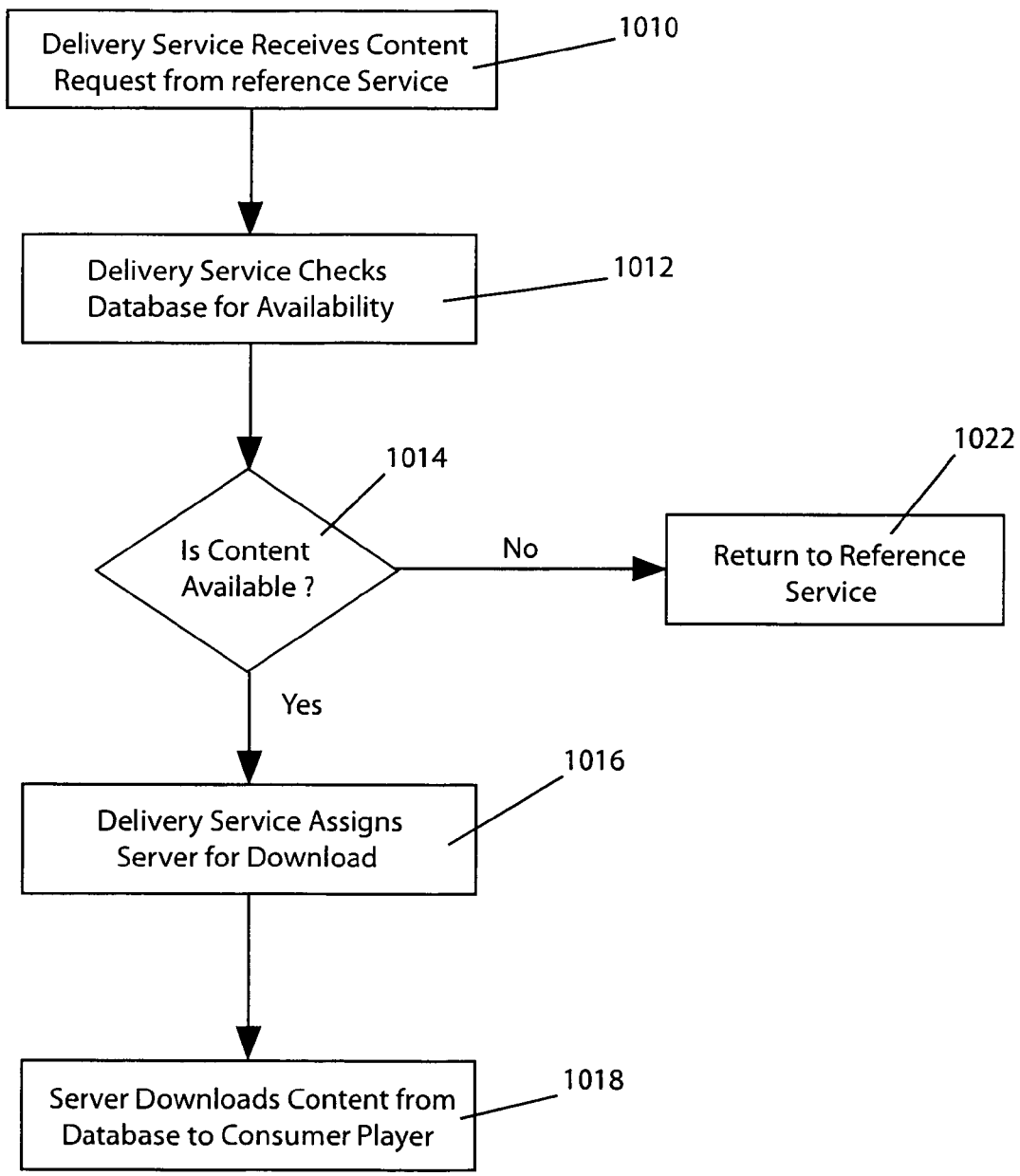
FIG. 6 is a flow chart showing a method for acquiring content in accordance with another embodiment.

Referring to FIG. 6, the Delivery Service receives the content request from the Reference Service where the request includes a unique reference to content (step 1010). The Delivery Service checks the database to determine whether the content is available (step 1012). In the rare instance that there is a reference to content but the content does not exist or has been removed from the database of content maintained by the system, the Delivery Service can access a handle in the reference and determine where the content can be acquired from.

The above description illustrates a system of distributors/retailers/consumers interacting in the value chain. Below is a description of how each party joins the value chain.

Typically, when a new retailer becomes part of the system, a "paper" contract is first executed. The "paper" contract is encoded into two e-Contracts: Distribution and Financial. For a large retailer these generally are a Distributor-Retailer Distribution Contract and a Distributor-Retailer Financial Contract. Affiliate retailers generally may fall under already existing Group Distribution Contract and a Group Financial Contract. Large retailers may receive a secure copy of their Distributor—Retailer Distribution Contract.

When new content is prepared for distribution, the content owner/distributor produces General Content Distribution Rules which are packaged with the content. These rules may also be stored in the Reference Service and sent to the large retailers who decide to offer the content. The distributor decides whether existing "blanket" contracts apply or whether specific contracts need to be established. In the latter case, a Group Content Distribution Contract and/or a Retailer Content Distribution Contract may be generated for distribution purposes, while a Specific Content Financial Contract (Term Sheet) and/or a Specific Content Group Financial Contract may be produced for financial settlements.

A Distributor—Retailer Distribution Contract (or Content Owner—Distributor Distribution Contract—the invention can is devised to accommodate contracts between any two members of the value chain) is a set of business terms expressing a contractual relationship for content distribution between a distributor and a specific authorized retailer. This contract applies to all titles (content) distributed by that retailer. Some examples are as follows:

"Retailer A may sell distributor's content in the Territory X."

"Retailer A may use its own e-commerce system for selling the content."

"Retailer A may offer distributor's content on a 'purchase outright' basis."

"Retailer A may not offer distributor's content on a 'rent to own' basis."

A Group Distribution Contract is a set of business terms expressing a contractual relationship for content distribution between a distributor and a group of authorized retailers (e.g., Affiliate Retailers). Again, this contract can also be between the content owner and a group of distributors. This contract applies to all content distributed by that group of retailers. For example, "Affiliate Retailers may offer distributor's content on a 'purchase outright' basis only."

A Group Content Distribution Contract is a set of contractual requirements expressing terms for distribution of a specific unit of content and applies to a group of authorized retailers (e.g., Affiliate Retailers) distributing that content. For example, "This content can be offered by Affiliate Retailers on a 'purchase outright' basis only."

A Retailer Content Distribution Contract is a set of contractual requirements expressing terms for distribution of a specific unit of content by a specific retailer. This contract applies to that retailer only and that content only. For example, "This content can be offered by Retailer A on a 'rent-to-own' basis."

General Content Distribution Rules are contractual requirements expressing terms for distribution of a specific unit of content. These rules apply to all authorized EMD retailers distributing that content. Examples of such rules include:

"This content can only be distributed in the Territory X only."

"This content can be offered on a 'purchase outright' or 'pay-per-use' basis."

"Offers on this content can be made for up to 3 months duration."

General Distributor Rules are requirements expressing a distributor's terms for distribution of its content which have not been expressed elsewhere. Exceptions fall into this category. These rules apply to all retailers offering the distributor's content. Examples of such rules include:

"Candidate retail offers can not combine content from Distributor A and Distributor B."

"Candidate retail offers can not combine content from Artist C and Artist D."

Suggested Distributor Rules are not based on contractual requirements but rather represent suggestions designed to prevent human errors which may not violate contracts per se but may not make logical sense. Generally, these rules apply to all retailers offering the distributor's content. Examples include: "Retail price for this content is expected to be between $8 and $12." If someone enters a price of $1, this rule may prompt them to confirm "Are you sure you meant $1?"

A Distributor—Retailer Financial Contract is a set of business terms expressing a contractual relationship for division of revenues between a distributor and a specific authorized retailer. This contract applies to all content distributed by that retailer. Some examples are as follows:

"Retailer A pays distributor $8 for each content sale up to 10,000 sales, $7.50 between 10,000 and 20,000 sales, $7 over 20,000 sales (wholesale model)."

"Retailer B receives 10% commission for each pre-super-distribution sale, 7.5% for the first super-distribution, 5% for the second super-distribution, 2.5% for the third super-distribution, 0% afterwards (commission model)."

A Specific Content Financial Contract (Term Sheet) is a set of business terms expressing a contractual relationship for division of revenues between a distributor and a specific authorized retailer for a specific unit of content. This contract applies only to this content distributed by the retailer. For example, "Retailer A pays distributor $10 for content sale up to 50,000 sales, $9 between 50,000 and 100,000 sales, $8 over 100,000 sales (wholesale model)."

A Group Financial Contract is a set of business terms expressing a contractual relationship for division of revenues between a distributor and a group of authorized retailers (e.g., Affiliate Retailers). This contract applies to all content distributed by that group of retailers. For example, "Affiliate Retailers receive 10% commission for each pre-superdistribution sale, 5% for the first super-distribution, 0% afterwards (commission model)."

A Specific Content Group Financial Contract (Term Sheet) is a set of business terms expressing a contractual relationship for division of revenues between a distributor and a group of authorized retailers (e.g., Affiliate Retailers) for a specific unit of content. This contract applies to that unit of content only and to that group of retailers only. For example, "For Content X Affiliate Retailers receive 5% commission for each pre-superdistribution sale, 2.5% for the first super-distribution, 0% afterwards (commission model)."

The e-contracts and business rules related to distribution are accessed and applied when the system validates a candidate retail offer. The same algorithm applies whether the offer is a candidate retail offer from a retailer or an offer being exercised by a consumer.

In applying the e-contracts and rules, the general approach is that a more specific contract or rule overrides the less specific one. For example, if the retailer's contract says "no pay-per-play" offers but for a specific content a retailer has a contract allowing "pay-per-use" offer, such an offer will be allowed for that content only. In the offer management all the applicable sets of rules (contracts) must be tested in the validation process.

Figure 7:
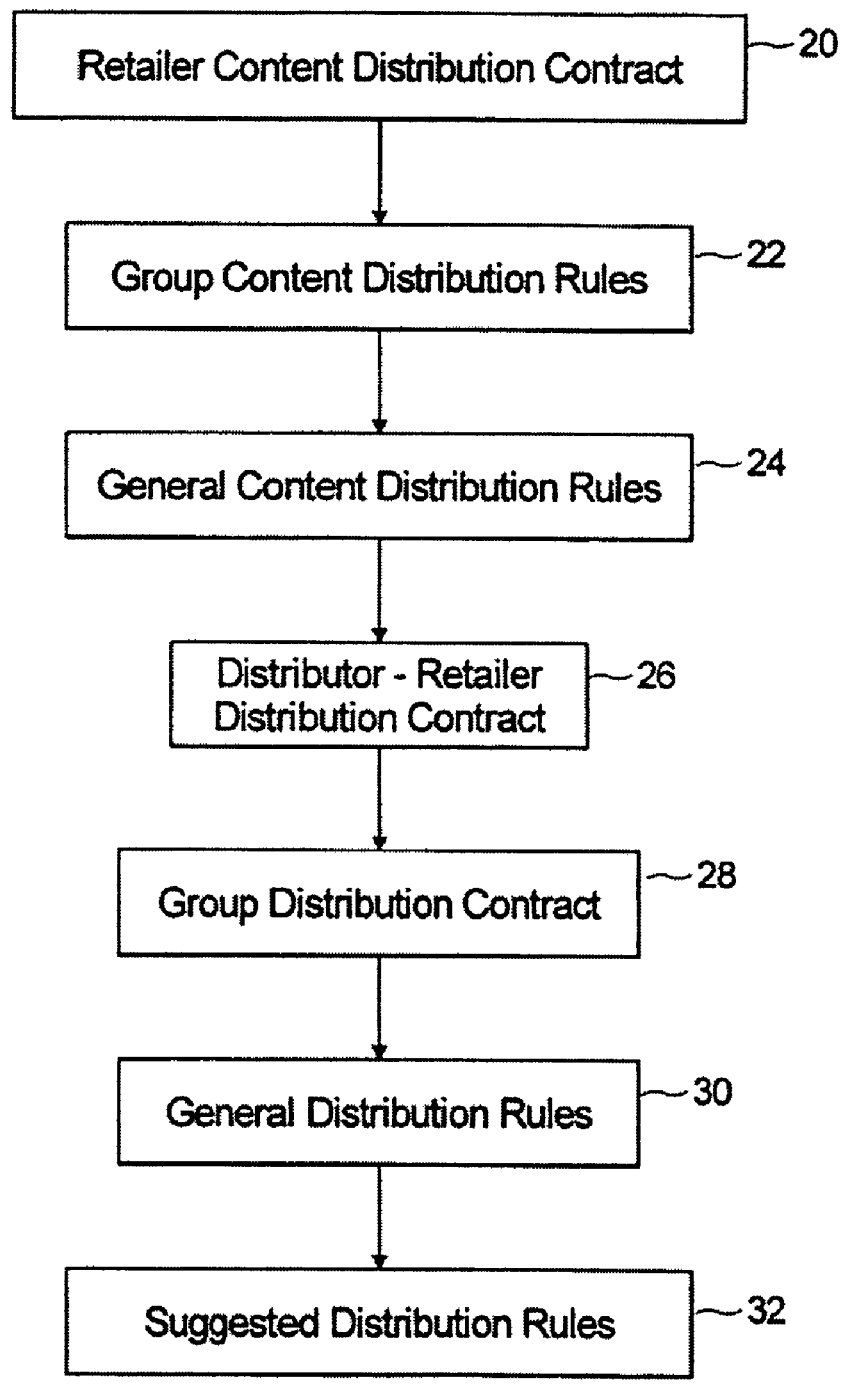
FIG. 7 is a flow chart showing the validation process of the a further embodiment.

For example, Retailer A presents the candidate retail offer for Content B. Reference Service runs a validation process presented below. Referring to FIG. 7, for each contract or rule that may be applicable, the Reference Service (RS) determines whether the candidate retail offer is consistent with the applicable contract or rule. At step 20, the RS determines whether there is a Retailer Content Distribution Contract for Retailer A, Content B. If such contract exists, the RS determines whether the candidate retail offer is consistent with the contract. At step 22, if Retailer A belongs to a Group G, the RS determines whether there is a Group Content Distribution Contract for Group G, Content B and whether the candidate retail offer is consistent with this contract as well. At step 24, RS references the General Content Distribution Rules for Content B and checks for consistency. At step 26, if there is a Distributor—Retailer Distribution Contract for Retailer A, the RS determines whether the candidate retail offer is consistent with this contract. At step 28, if Retailer A belongs to a Group G, the RS checks the applicable Group Distribution Contract. At step 30, the RS references the General Distributor Rules and at step 32, the Suggested Distributor Rules to confirm that the candidate retail offer is consistent with these rules.

If all checks are satisfied, the candidate retail offer is validated and becomes a certified retail offer. In the sequence presented the more specific checks (lower numbered steps) override any less specific checks (higher numbered steps) when there are conflicts. The order in which the contracts and rules are referenced may be determined by the specificity of the terms within the contracts.

Figure 8:
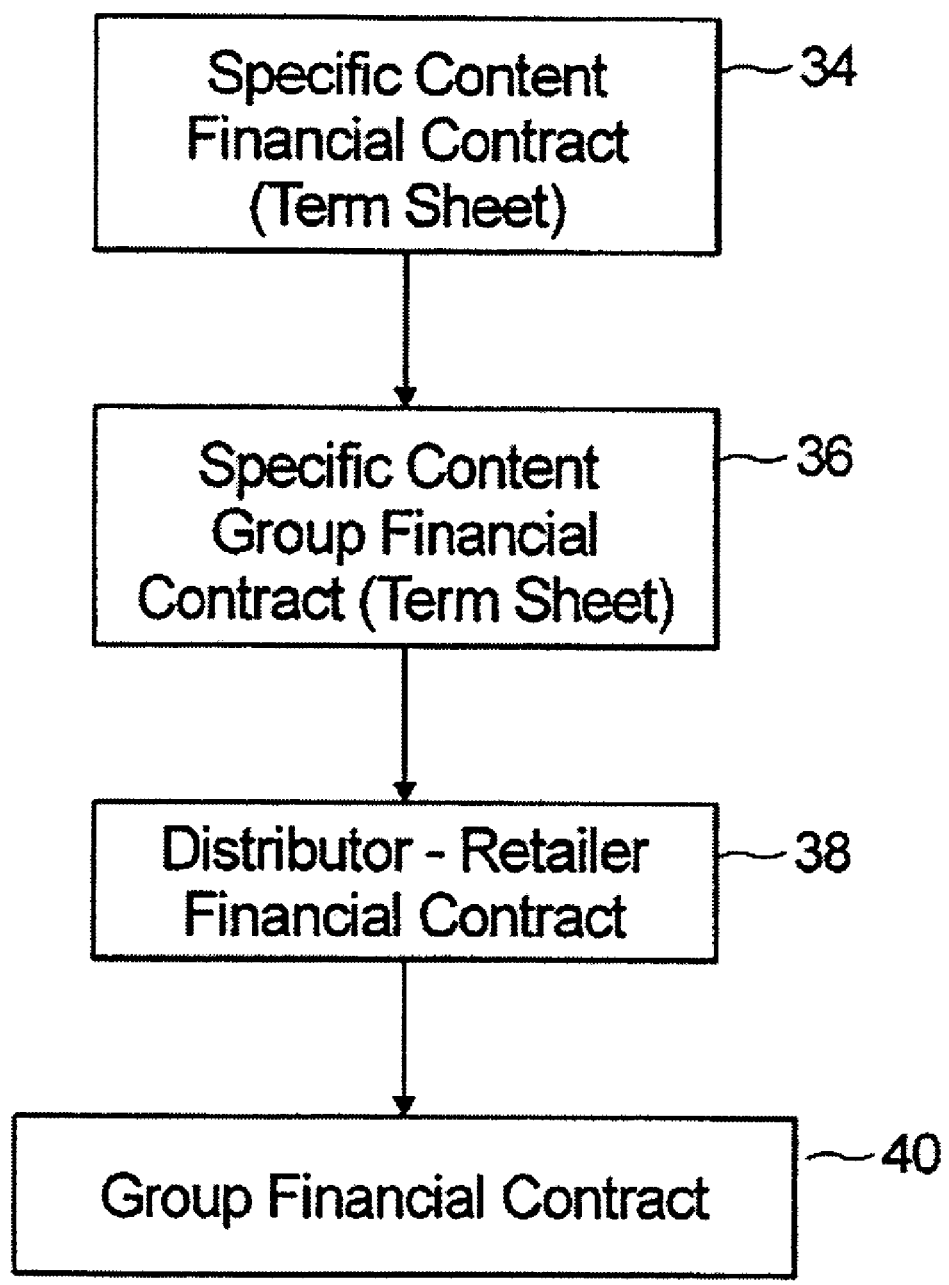
FIG. 8 is a flow chart showing the determination of revenue disbursement according to an embodiment.

E-Contracts and business rules, if any, related to financial transactions are applied when a candidate retail offer is exercised by a consumer. For example, a record of transaction is reported to a financial clearinghouse when a consumer exercises a candidate retail offer from Retailer A for the Content B. To determine revenue splits the Financial Clearinghouse runs a process presented below. This is a simplified process ignoring volume discounts. Referring to FIG. 8, at step 34, the financial clearinghouse (FCH) determines whether there is a Specific Content Financial Contract (Term Sheet) for Retailer A, Content B. If such a contract exists, the FCH applies the contract terms to the reported record of transaction. At step 36, if Retailer A belongs to a Group G, and there is a Specific Content Group Financial Contract for Group G, Content B, FCH applies these terms as well. At step 38, the FCH determines whether there is a Distributor-Retailer Financial Contract for Retailer A and if present, applies this contract to the reported transaction. At step 40, if Retailer A belongs to a Group G, the FCH checks and applies a Group Financial Contract.

Figure 9:
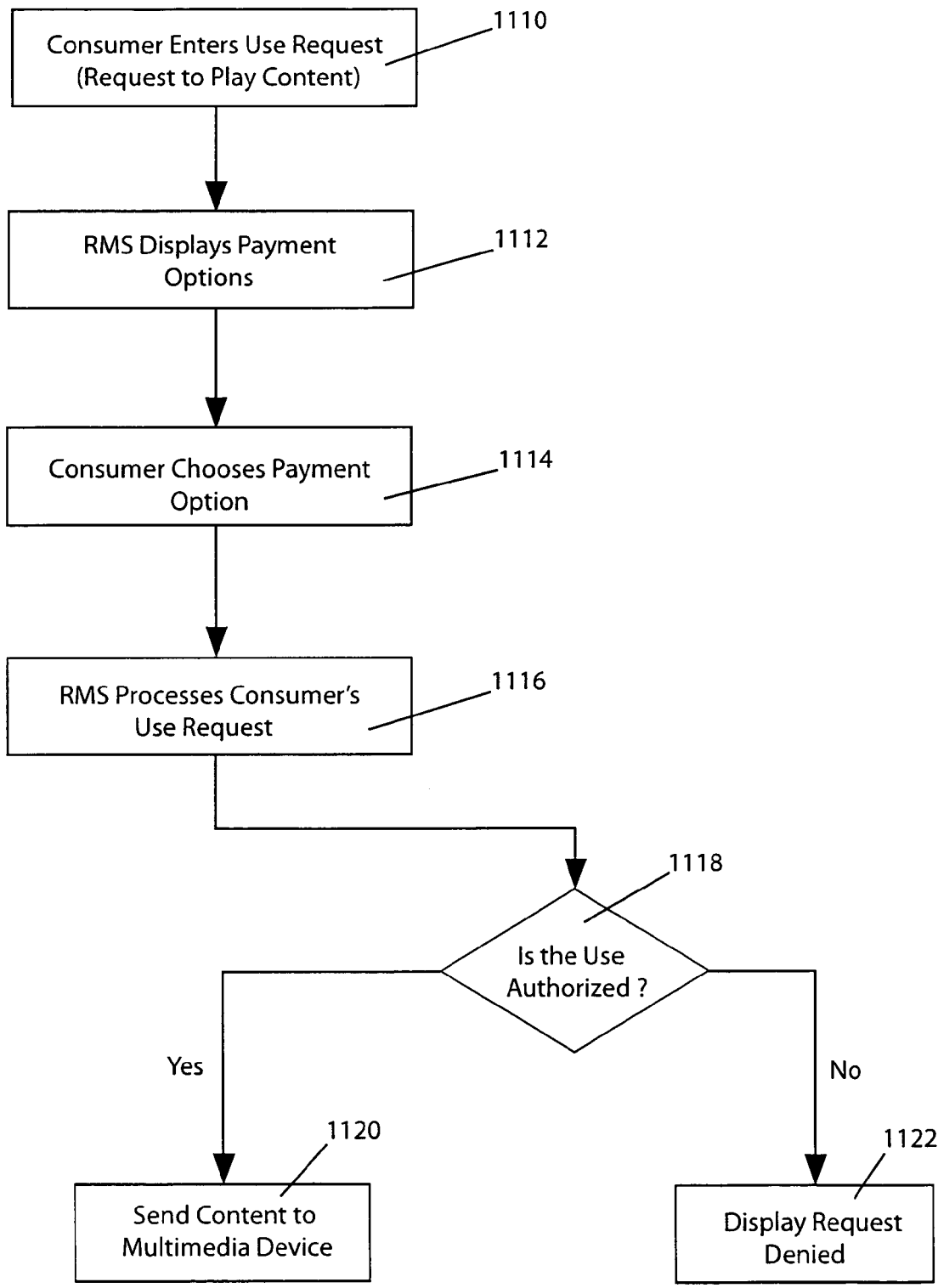
FIG. 9 is a flow chart showing a method for exercising an offer for content in accordance with another embodiment.

In an alternate embodiment, after the consumer acquires content and it resides locally, the consumer may proceed to exercise the candidate retail offer associated with the content. Referring to FIG. 9, for the consumer to exercise a candidate retail offer, the consumer requests to play the content (step 1110). The payment options are displayed (step 1112) and the consumer then chooses a payment option (step 1114). The consumer's request to use or play the content is processed (step 1116) and it is determined whether the use request is authorized (step 1118). Provided the use is authorized, the content is played back (step 1120). If the use is not authorized, the consumer is notified that the use request is denied (step 1122).

Figure 10:
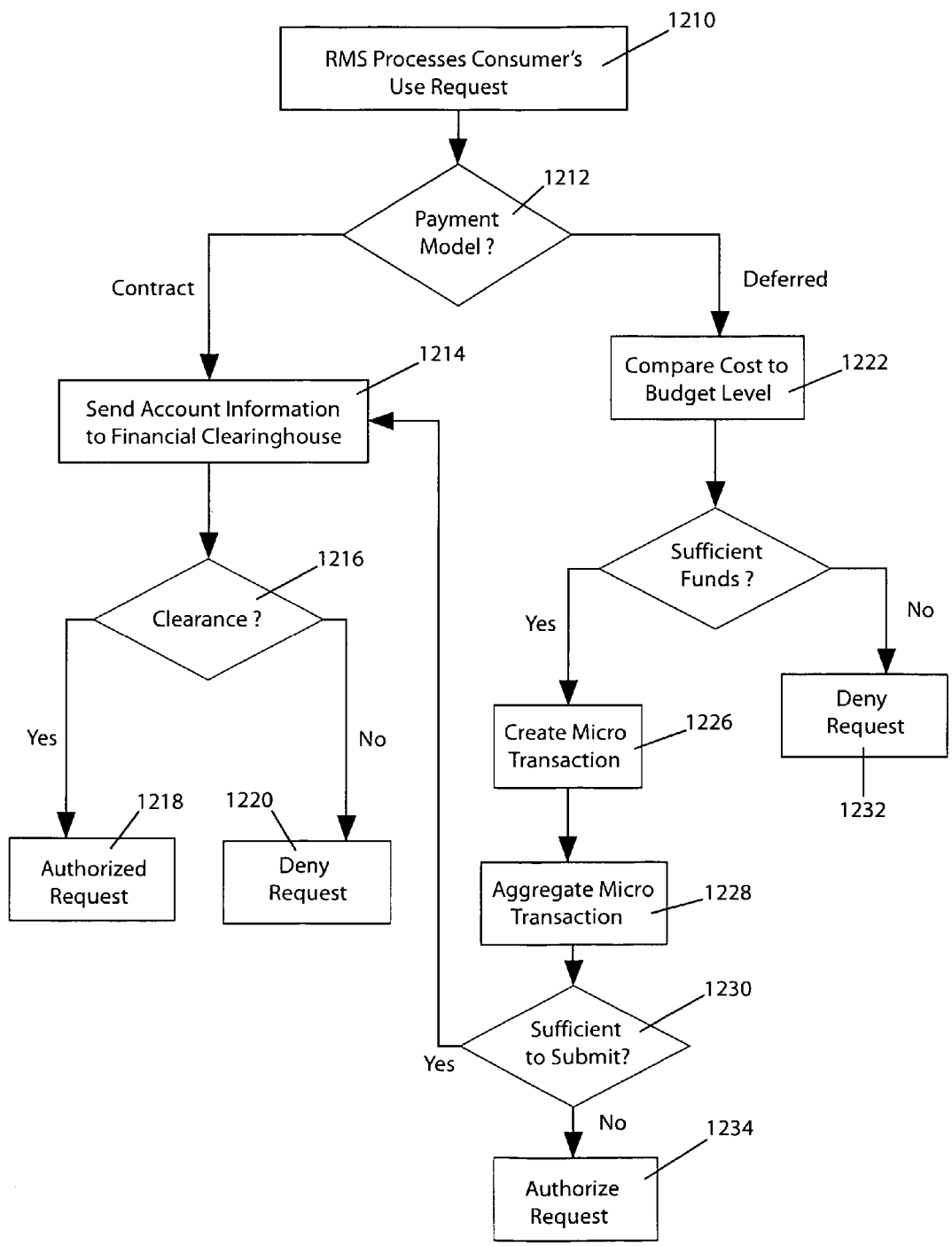
FIG. 10 is a flow chart showing a method for processing a request to use content in accordance with a further embodiment.

Referring to FIG. 10, the consumer's use request is processed, for example to play a piece of musical content (step 1210). If the consumer selected the contract model for payment (determined at step 1212), account information is sent to the Financial Clearinghouse (step 1214) which processes the transaction (cost of the content use request) immediately. If the transaction is complete, the Financial Clearinghouse returns clearance (step 1216) and the content use request is authorized (step 1218); otherwise the content use request is denied (step 1220). If the consumer instead chooses the deferred payment model (determined at step 1212), the cost of the use request is compared to the consumer's remaining budget level (step 1222). If there are sufficient funds (determined at step 1224), the remaining budget level is adjusted and a micro transaction is created (step 1226) which is added to the consumer's past micro transactions (step 1228). When the aggregate of transactions exceeds a certain threshold, e.g., number, dollar amount, etc. (step 1230), the aggregated transactions are sent to the Financial Clearinghouse for clearance (step 1214). Otherwise the use request is authorized (step 1234). If there are insufficient funds, the request is denied, i.e. not authorized (step 1232).

The consumer may choose to exercise an offer for which the content is available locally. In this situation, the Consumer Player displays the rules for exercising the content (e.g., "$10 to purchase outright or $1 to listen once"). The rules might be modified by the consumer's attributes (e.g., consumer belongs to a club X and the rules specify that "members of club X can purchase for $9"). The consumer chooses one acquisition option and the Consumer player checks the conditions by comparing the acquisition rules against the consumer's financial status. For example, the Consumer Player checks that there is a sufficient budget available to perform the transaction. Provided the consumer has a sufficient budget, the consumer acquires the rights. Then, the consumer is allowed to play the music or display graphics, etc. in accordance with the acquired rights. The acquired rights are included in the transaction database created and stored locally by the consumer. Additionally, for each use of the content, a transaction record is created and included in the database indicating the use. At a later date, the transaction record is aggregated with other transaction records and reported to the Financial Clearinghouse.

In the event that the consumer selects a certified retail offer that has expired, the consumer will be offered a choice of valid offers. Selecting an expired certified retail offer may arise when the consumer clicks on a locally stored reference describing a timed-out offer to a previously downloaded content when it is then determined that the offer has expired. The consumer is then offered a choice to use the content's Default Offer or attempt to find another candidate or certified retail offer from the same retailer. If the consumer chooses the Default offer, the content is purchased with the Default Offer. If the consumer chooses to find a substitute, the Consumer Player messages the Reference Service which finds a substitute offer from the same retailer. In either case, the Consumer receives a valid certified offer.

Retailers or distributors may revoke a certified retail offer in the event that revocation is necessary for business reasons or otherwise. The retailer or distributor may revoke an individual candidate/certified offer from a specific retailer, or all offers from a specific retailer. Subsequently, when the consumer attempts to exercise such offers, they are informed that the offers are not valid and are provided with an alternative offer.

The distributor's Reference Service and appropriate clearinghouses are notified of the revocation of the offer, causing a message from the Reference Service to be broadcast to all the consumers. If the consumer does not have the content, the Consumer Player contacts the Reference Service with a request to download. If the consumer has the content and is presently connected, the Consumer Player contacts the Reference Service with a request to validate. In either case, the Reference Service determines that the offer has been revoked and proposes an alternate offer. If the consumer has the content and is not presently connected, the consumer is allowed to exercise previously acquired rights and the conflict is resolved later during clearing.

For select content, the Default Rights allow the consumer to copy the acquired content from the Consumer Player to another medium. This subject medium may be a Consumer Electronics Device, a Consumer Electronics Portable Media (e.g., Flash-RAM) or a DVD-RAM. When the consumer chooses to exercise the right to copy, the consumer is limited to the copying rules specified in the default rights and the rights acquired for that content. The consumer uses the Consumer Player to assist in copying the content. When the consumer copies the content onto, for example, Consumer Electronics Portable Media, the Consumer Player assists in converting the content to an appropriate format for the Consumer Electronics Device. The resulting content can then be played on a Consumer Electronics Hardware Player. The Consumer Player in conjunction with the RMS will not allow the consumer to make more copies than the rules allow.

In addition to obtaining content directly over the Internet, content may be obtained on physical disc. In this case, the consumer receives a replicated disc with the content in system-compatible format and the consumer may transact with the system to acquire the rights to use this content. When the Consumer Player plays the content, the content rights are negotiated with the RMS in the Consumer Player. Knowing it as a replicated disc, the Consumer Player negotiates the rights with the RMS in the Financial Clearinghouse. If the consumer is already an account holder, the rights are established directly, and payments are effected. If the consumer is new to the system, the Financial Clearinghouse establishes an account, registers the consumer and establishes RMS for the content on the disc (as described above). The RMS allows the music to be played if sufficient budget is available.

Price Dereferencing (by Category): In the price dereferencing pricing model, prices are never directly referred to; rather they are dereferenced. Each piece of content is assigned to a category and pricing is determined according to the categories. For example, if a front line category is e.g., AA, all AA content may currently be $15.98. However, if at some time in the future, front line content AA increases to $16.49, then this information will be stored locally and would be used to display current prices when purchasing off line.

There is one case where content is allowed to migrate from one category to another, and this is from a list price category to a super-list category. List prices apply to conventional distribution, typically from a retailer to a consumer. Super-list prices apply to super distribution transactions where a consumer distributes the content (it received from a retailer) to other consumers who in turn may further distribute the content to more consumers. This is generally limited and moving content from Super-list back to List means removing it from the lookup table.

Territorial considerations taken into account in the pricing model include whether an item is distributed by the same distributor in multiple territories or whether an item is distributed by multiple distributors in the same territory. Further, dynamic and/or volume based pricing may be implemented, in addition to default or fixed pricing.

Super distribution tracking: Handles referring to content (described in detail below) or the content itself may be super distributed. Each time that they are super distributed, a counter in the handle can be incremented. Whether or not a retailer participates in the value chain of a super distributed sale depends on how many (if any) super distributions are specified in the contract between the distributor and the retailer. Each increment of the super distribution tick may be used to adjust the retail tick. For example, the retail tick may be 100% for an original sale, 75% for a first super distribution, 50% for a second super distribution, 25% for a third super distribution, and 0% for all further super distributions. Tracking may also be implemented based on date, e.g., from date of purchase or from date of release. In the latter case, the tracking may be as follows: 100%, first week; 50%, until one month; 25%, for six months; and 0%, after six months.

Delivery tracking/payment: Payments to value chain participants may be impacted by the means of delivery. For example, extra value delivery services, such as cable, satellite, ISP caching, RSVP, may impact the offer in that they typically include direct payments to the delivery service. Because delivery costs are oftentimes significant, prepayment discounts may also be utilized in order to entice consumers to agree to purchase before downloading. Offers reflecting discounts for prepayment may be achieved globally, per retailer/class of retailer, affinity v. full featured, online v. brick and mortar, individual retailer basis, or per content item. Resellers, e.g., the owner of a kiosk, may also be entitled to a share of the retail tick, or an additional retail tick.

Thus, the above describes a system wherein the contractual relationships can be dynamically set and updated. Since the candidate retail offers are not packaged with the data they can be updated at the moment the relationship or rules between the value chain parties changes. A simple example is between a distributor and a retailer, wherein the distributor changes the price for the distribution of certain content, once the rules are changed, no candidate retail offer with the old price can be validated. The consumer can be offered a substitute offer reflecting the new price. Thus, the retailer does not have to worry about changing the candidate retail offers on his web site 'instantly' to make sure he complies with the price change. Additionally, the change in the contractual agreement can be between the content owner and the distributor which may effect the how the content is sold to the consumer. The retailer does not need to be informed, the rules will automatically and dynamically update to reflect the change and the new rules are applied when the consumer attempts to exercise the candidate retail offer. Under prior art content distribution systems, every item of content affected by the price change must be 'unpacked' and 'repacked' with the new rules so they can be sold according to the updated contract. This unpacking and repacking requires time, man, and computing power to effect the change.

The interaction between the rules and the candidate retail offer, to validate the candidate retail offer, is not a negotiation between non-contractual parties. It is a dynamical updated rule set that is not statically contained within the content to be distributed.

Another embodiment involves a method for distributing electronic media content over a network between the retailer and distributor. In this embodiment, the retailer distributes the content to the consumer and the distributor has rights in the content. The retailer and the distributor enter into a electronic contract, for example a distribution and financial contract described above.

The terms of the contract are not stored with the content. This allows the most up-to-date contract to validate the candidate retail offers. The rights and permissions that govern the distribution of the content are created and stored separate from the content. The terms governing the distribution of the content can be updated without finding and updating every piece of packaged content. The content can be anywhere while the terms are changing, and then at the time a consumer wants to purchase the content is the content "matched" to the terms governing it and the candidate retail offer is validated as descried below. Thus, the terms are dynamically updated.

Once the electronic contract is settled, it is provided to the system. A candidate retail offer for the distribution of the content is presented to the consumer. The consumer requests to exercise the candidate retail offer and the request is sent to the system. The candidate retail offer for the distribution of the content is validated by accessing the electronic contract and determining if the candidate retail offer is consistent with the electronic contract. Upon successful validation the content is provided to the consumer and compensation information is received from the consumer indicating at least the amount of compensation for the content provided. Once the compensation information is received, the compensation is allocated according to the electronic contract.

Another embodiment is the validating step includes referencing, in the electronic contract, one or more terms for electronic distribution of the content. The candidate retail offer is compared to the one or more distribution terms and validated when the candidate retail offer is consistent with the one or more distribution terms.

The above dynamic system, in a preferable embodiment, can be used to assist in the distribution of content using content references or handles.

The system transports content to consumers in a timely and efficient manner. The nature of content is that they are large objects, typically multiple megabytes in size. Content tends to require large amounts of data and the more complex the content, such as video material, the more voluminous the data. Because of the volume, it is not efficient to transmit the content in its entirety at every instance. Content transport requires a balance of bandwidth and time to get it to consumers. In addition, storage of content requires significant resources if it is to be kept by the consumer. The solution to this challenge is to separate descriptive information from the content itself, a content reference (handle). Thus, instead of transmitting the content, only a reference to the content is transmitted. When the user receives the reference, the user can access the content directly.

Content references provide a mechanism used by consumers, or any other party in the value chain, to receive, save, and share content identification information and to send it to other consumers without having to move large binary files around. A content reference can be thought of as an address or pointer to content and is the mechanism to refer to content indirectly. A content reference contains a small amount of descriptive information about a piece of content. This descriptive information contains sufficient information to allow a consumer with a Consumer Player to determine what the content is and how to get to the content, but does not contain the actual content.

Handles are references to content, not to the location of the content. Content stored on a server or other device connected to the network is accessible by specifying a content reference using an application appropriate for the network. The content reference along with supplementary information is packaged in a data structure called a handle to facilitate rendition of the content. A handle may be sent to another consumer by E-mail, Chat, Instant Messaging, Cell Phone protocols or TV/Video links. When the recipient is ready to render the content referenced by the handle, the recipient accesses the handle and activates the appropriate software application such as Consumer Player. The handle contains all the information needed to download the content, and if applicable complete any commercial transactions pertaining to the use of the content. Specifically, the handle can include information identifying each participant in the value chain, i.e., any entity that participated in the creation, resolution or transmission of the content that might receive some compensation for their participation.

Specifically, instead of transmitting the content, only a reference to the content is transmitted. When the consumer receives the reference, the consumer can access the content directly. The handle identifies precisely what the content is and is distinguishable from the prior art because conventional methods simply send only the location of the content. A handle is a discrete bit of information describing just the electronic content and does not contain the location of the content to be rendered.

In comparison the handle is not a Universal Resource Identifier ("URI"). A URI typically consists of the name of the machine hosting the content, the name of the content, and a path to the content. A typical URI may be read as follows, there is a document available [name] residing on [computer name] and accessible via [path descriptor]. Thus, a URI specifically identifies the location (path) of the electronic content. This is in contrast to a handle.

A URL is a type of URI and again only points to a location. The content of that location can be changed. Web pages, for example, can be updated without changing the URL. The handle does not follow a path to the content, thus the handle does not change even if the location changes. As an example, the same content can reside in many locations and the handle can, in an embodiment, link a consumer to all or most of them depending on the rights and the nature of the offer.

As an example, a fan club web site may include content references to songs for a particular artist without having to store large, unsecured content of that artist. Visitors to the web site will then download the content reference and through the Reference Server they will be directed to a Delivery Service from which they can download the content. That same consumer can also email the content reference to friends or place it on their web site for further dissemination of the content reference. Content references also provide a mechanism for consumers to share a music-listening experience synchronously and remotely. When a consumer is listening to music and wishes to share the experience with another consumer at a remote location he can drag a content reference into an email or chat client and send it to the other consumer. When the content reference arrives at the remote location the content reference can be opened, and using the time synchronization, the Consumer Player is able to start playing the referenced content at the same point the original user's content is playing.

Content references take the form of a message that is used system wide for inter-module communication. Each message contains at least a header section and an ID section and may contain additional sections, such as, an offer section, a synchronization section, a debug section and a support section (reserved for future use). For a content reference, the message must contain a meta-data section.

To support the electronic distribution of content over the Internet, for example, software applications may be implemented at the consumer's personal computer. A media player is one such application and provides an interface for the consumer to play the content. Commercially distributed content over the Internet may be placed in a secure format to prevent unauthorized use. For such secured content, the player effectively decrypts or otherwise processes the content in preparation for playing. For example, music may be encrypted in such a way as to prevent playing unless a payment is made to the retailer, distributor, or content owner for the use of the music. The player can assist the consumer in paying for the use of the music and then playing the music accordingly, for example, by interfacing with a payment clearinghouse and executing a payment transaction, as is well known in the art. The terms "play" or "render" with reference to the content include anything that can be done to or with the content, such as producing audio, displaying visual content, printing, and copying, etc.

The player may be used with content received over the Internet as well as locally stored content, i.e., stored on local or portable memory including diskettes, hard disks, optical disks, flash cards etc. The term disk is used throughout the description to refer to any such local or portable memory and is not intended to limit the scope of the invention. For content on disks, the player coordinates with the appropriate device such as a CD player, CD drive, DVD player, DAT player, VCR, etc. when rendering the content.

When the consumer engaging in e-mail or chat communications wishes to transmit content to another consumer, the consumer need not actually transmit the content itself but may instead send a reference to the content, namely a handle, so that the recipient may access the same content.

Figure 11:
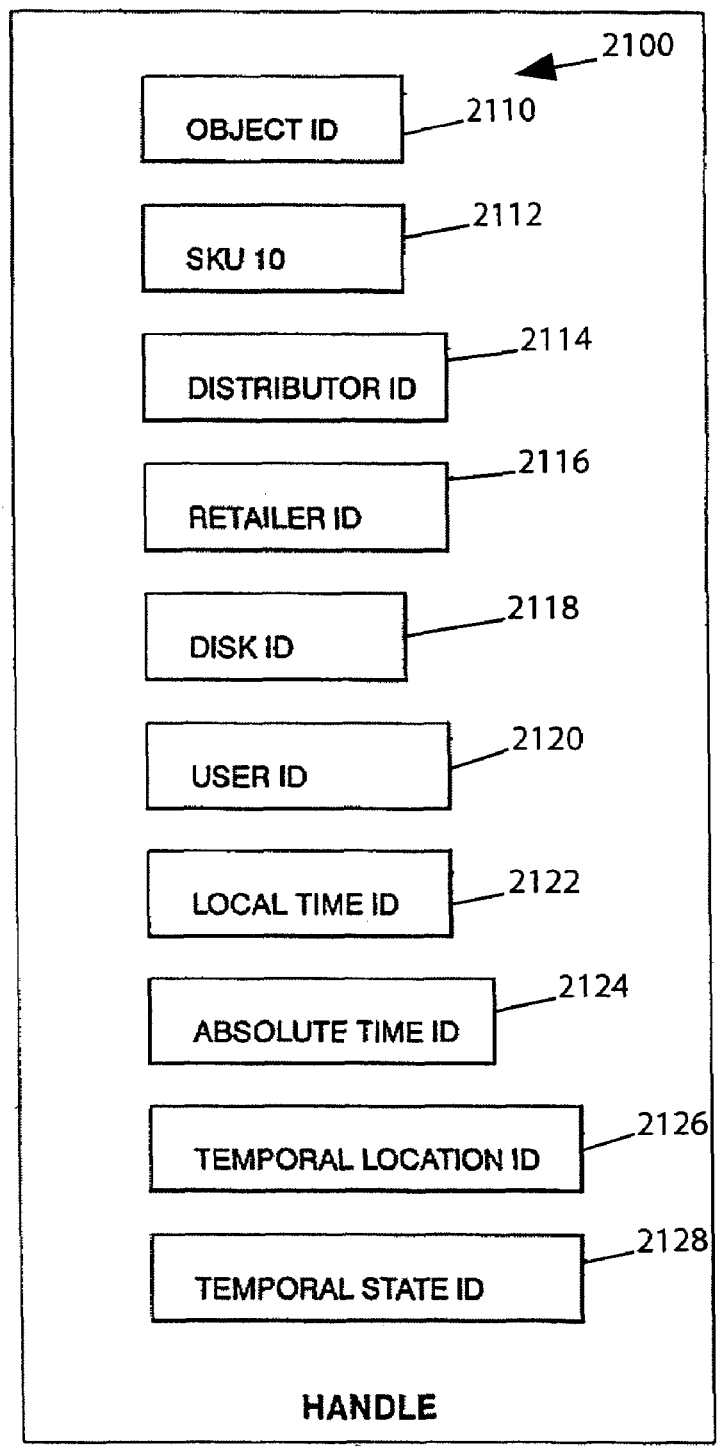
FIG. 11 is a block diagram of an arrangement of a Handle data structure for implementing the present invention.

Referring to FIG. 11, a handle 2100 is a small relatively secure data structure identifying particular content, and may contain various additional information about the content referenced. An Object ID 2110 may be included in the handle as a reference uniquely identifying particular content in a content object. The Object ID is essential for the effective implementation of a handle. However, for associated content a single handle may contain more than one Object ID, each referencing one piece of content.

To identify the particular product containing the content, a numbering system such as the stock keeping unit (SKU) may be used. In such a case, the handle would then include a SKU ID 2112.

As applied in the commercial environment where content is sold and distributed, the handle identifies the content and all the participants of the value chain associated with the content. Together, the Object ID and SKU ID precisely identify the content. Other identifiers may also be included in the handle to identify each of the value chain participants i.e. a value chain ID. The Distributor ID 2114 identifies the owner of or the agent of the owner of the content referenced. The Retailer ID 2116 identifies a retailer associated with the content referenced in the handle. This may be the retailer from whom the content was purchased, or any retailer that the distributor/content owner wishes to reference. For video content, the Channel ID of a network may be more appropriate than a Retail ID. The Channel ID may be, for example, HBO or ABC. The Renderer ID refers to the software that created the handle, such as Real Jukebox, which may participate in the value chain. The Carrier ID may refer to anyone who is actually responsible for carrying the content. For example, the Carrier ID may be AT&T if it was delivered over a telephone network or it could be the SD Memory Association, to effect payment to the patent pool allowing the memory format which supports superdistribution. An Offer ID is optional and is set when the offer is created and is unique to a retailer, channel or distributor.

Additionally, there can be a Content ID and/or Product ID that is unique to the content. The Media ID is also optional and identifies the physical media on which the content resides (CD, ECD or DVD, etc.). Another optional identifier is the Group ID but must be included if the Object ID is defined as a part of a group and identifies that group and uniquely identifies a group object from a specific Distributor ID. For example, the content reference is for musical content and the Content ID is for a single from an album, the album requires a Group ID.

Other identifiers include a Client ID and an Instantiator ID. The entity that creates the reference is the instantiator. This can be the distributor, the retailer, or the consumer. For example, when the consumer creates a reference by dragging a song from a play list in the player, they create a reference with the Instantiator ID set to the Consumer ID. Another is a Player ID. This is the ID of the player which is assigned by the back office system(s) in a range and/or prefix to enable the Consumer Player to be uniquely identified. The above identifiers are useful when performing a commercial transaction related to the content, such as a purchase. The application of the above e-contract system that dynamically computes offers for the sale or rental of content may use the value chain information in conjunction with a database of commercial information to generate the offers.

For example, a retailer may have contracted with a distributor for a 2% cut of the price provided the price is at least 7% above manufacturer cost and the retailer may have a mark up of 10% above cost. When a consumer wants to purchase particular content, the reference service can use the information in the handle, such as the Retailer ID, to determine a valid offer based on the commercial information available from (or regarding) that retailer and provide the consumer with such an offer. The terms of an offer may be included in the handle as well. For example, the consumer may be presented with an offer to play the video for $2 per use anytime for a period of one year. Price, expiration date, and to whom payment is to be made are examples of terms that may be included in the handle.

The concept of a handle is flexible and can refer to content stored locally or remotely. If the content is stored remotely, it is accessible through connection to a network such as the Internet. Where the content is accessible through the Internet, the Object ID may be a Uniform Resource Locator (URL). Content stored locally includes any kind of medium such as CD, DVD, Flash memory, and hard drive. For locally stored content, a Disk ID 2118 may be included in the handle.

Typically, handles are processor generated (e.g. by a computer or consumer device) when they are sent, but they can be stored locally or on a server and retrieved as needed. When a consumer retrieves a handle and wishes to send it to another consumer, a Consumer ID 2120 may be included in the handle to identify the consumer who is now sending the handle.

To facilitate synchronization (described in more detail below), the handle may contain the time when the handle is sent and information about the rendition of the content at the sender's location. For example, the handle may include a Local Time ID 2122 and an Absolute Time ID 2124. The Local Time ID is the local time as known by the device rendering the content. The Absolute Time ID is the absolute time as known by the network, e.g. GMT. The handle may also include a location marker to indicate a particular point or place in the content. For example, if the content is a video, the marker may be set to a particular scene, so that the scene may be referenced directly. Such information is contained in a Temporal Location ID 2126 which refers to a position, in the temporal domain, of the object referenced. For example, a Temporal Location ID may be expressed in units of time, e.g., 1 minute: 23 seconds, or alternatively units of frames, e.g., 18 frames. In addition to marking a place in the content it is useful to note the state of the content, such as play or pause. The state of the content may be included in the handle in the form of Temporal State ID 2128.

Handles may be specialized for specific environments or applications. For example, handles may be customized to create Network Handles which facilitate the electronic distribution of media over a network environment and the rendition of that media. A Disk Handle may be created to facilitate rendition of media stored locally. In addition, handles may be customized to create Synch Handles which facilitate the synchronization of the rendition of the media in multiple locations. Each of these three examples is discussed below.

Network Handles usually contain the basic information needed to refer to, acquire and consume Content Objects that have been electronically distributed over a network. A Network Handle would typically include the SKU ID, Distributor ID, Retailer or Channel ID, Renderer ID, Consumer ID and some number of Object IDs.

Figure 12:
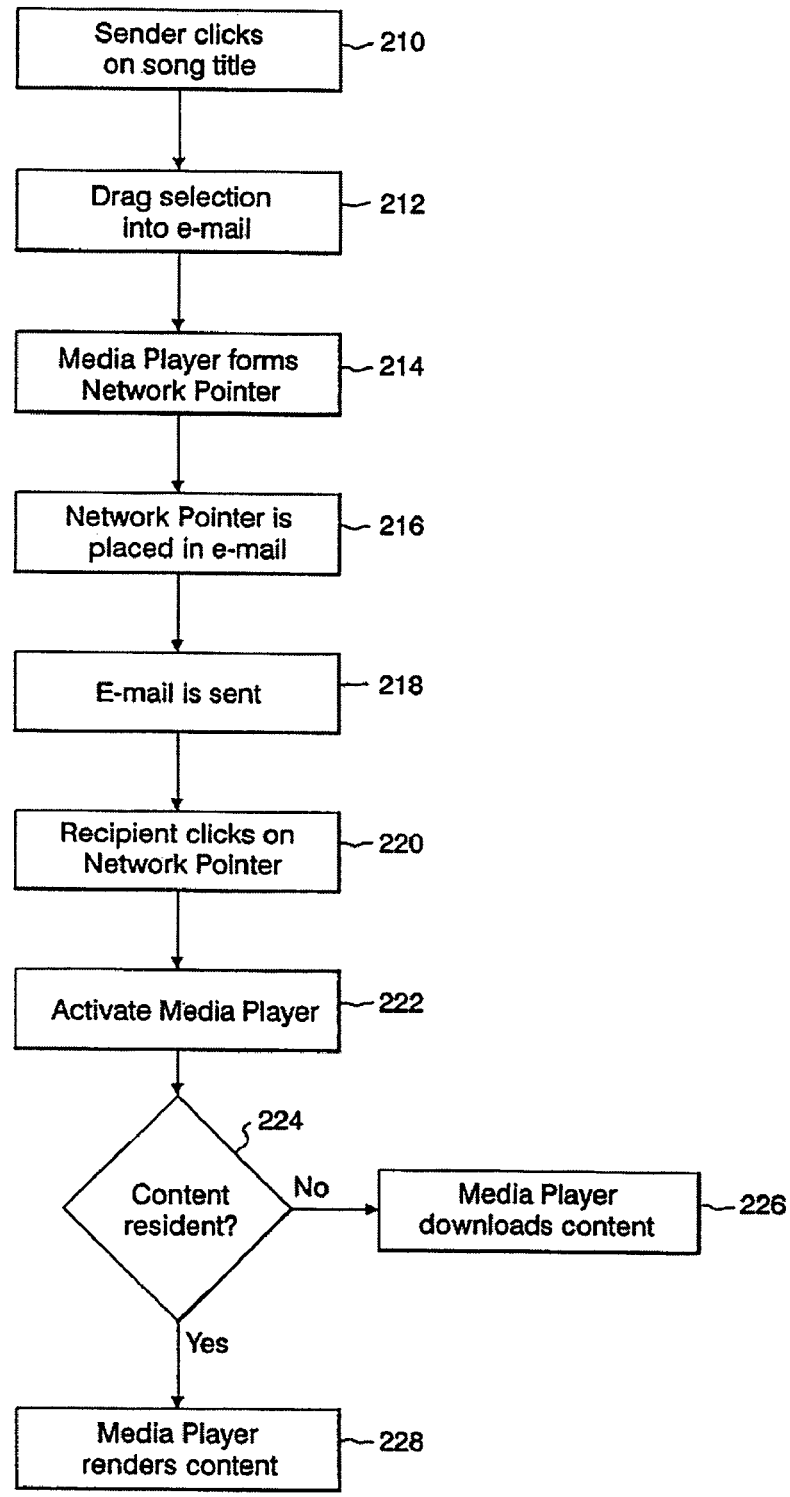
FIG. 12 is a flow chart showing a method for using the Handle in accordance with an embodiment of the present invention.

A consumer can attach a Network Handle in any number of ways, such as menu access, drag and drop, etc. Referring to FIG. 12, in a typical player environment the sequence is as follows: At step 210, the consumer clicks on a song title or other display element, which refers to a Content Object. At step 212, the consumer drags the selection into an e-mail message. At step 214, the player software binds together all the identifiers into the Network Handle. The identifiers include the Object ID(s), SKU ID, the Consumer ID and identifiers for each of the participants of the value chain, e.g., Distributor ID, Retailer ID and Renderer ID. At step 216, the handle is placed into the e-mail message. At step 218, the e-mail is sent to the recipient. At step 220, the recipient reads the e-mail and opens or accesses the handle. At step 222, the e-mail application communicates with the operating system to call the application, which the consumer has designated to resolve handles, usually, Consumer Player. The player may assist the consumer in acquiring and rendering the content. At step 224, the Consumer Player determines whether the content is resident locally. Typically, the content may be resident locally if the consumer previously acquired the content and stored it locally. If the content is not resident, at step 226, the player uses the handle to remotely access and download the content stored on some network server. Then at step 228, the Consumer Player serves as an interface to facilitate the rendition of the content. The player uses the handle (possibly in conjunction with other information such as commercial terms set by a retailer for that content) to determine the range of uses for which the consumer is authorized and/or has paid.

Disk Handles work in a similar fashion as Network Handles. The typical sequence is as follows: Consumer clicks on a display element which refers to content on the disk, e.g. a song title. Consumer drags the selection into an e-mail message. The player software binds together the Object ID(s), SKU ID, Consumer ID, and Disk ID for the content (e.g., song). The player also binds the Retailer Id and identifiers for other value chain participants. The Disk Handle is placed into the e-mail message and the e-mail is sent to the recipient. The recipient then reads the e-mail and opens or accesses the handle, which results in the e-mail application communicating with the operating system to call the application, which the consumer has designated to resolve handles, usually, a Consumer Player. The player renders the content (if it has the right to) and if the disk is available (inserted, attached, on network). If the content is not available, the consumer is given the choice of either inserting the disk (or connecting to the network) or going to a retail web site (on the Internet or other network) to purchase the disk or its electronic equivalent.

Synchronization Handle (Synch Handle) is a specialized handle that can be used in networked environments to synchronize two or more Content Objects that have temporal characteristics. To create a Synch Handle, the player application typically binds together the Temporal Location ID, Temporal State ID, the Local Time ID, the Absolute Time ID and the Object ID into a handle that can be attached to or inserted in an electronic communication (e.g. chat window). The Synch Handle may be either a Network Handle or a Disk Handle with temporal information (the Temporal Location ID, the Temporal State ID, the Local Time ID, and the Absolute Time ID). The temporal information is used to synchronize temporal rendition (e.g. playing audio or video) when engaging in a dynamic chat.

Figure 13:
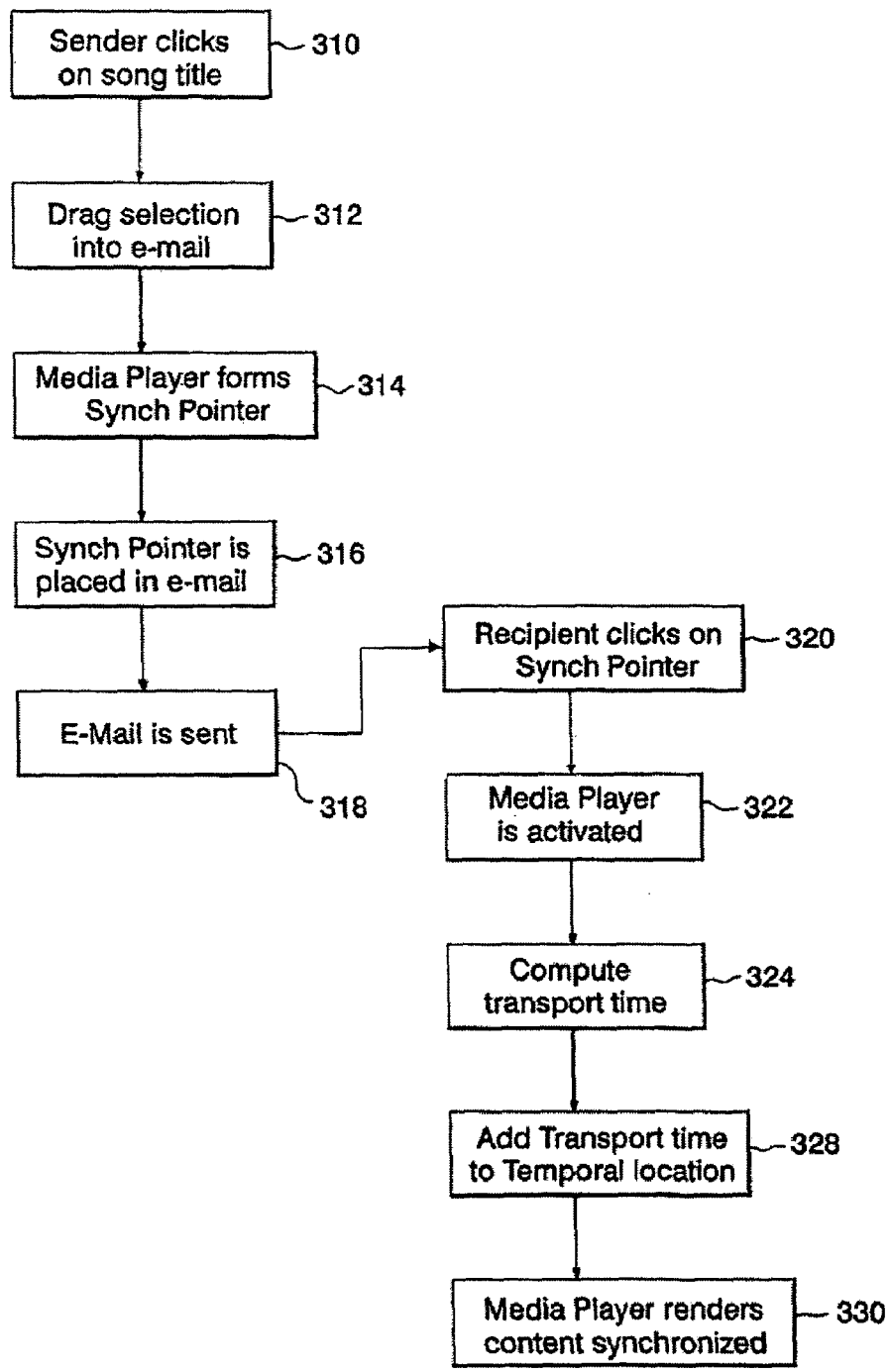
FIG. 13 is a flow chart showing an alternative method for using the Handle in accordance with an alternative embodiment of the present invention.

Referring to FIG. 13, a sample usage scenario of the Synch Handle for a disk is as follows: At step 310, the consumer clicks on a song title or other display element which refers to content on the disk. At step 312, the consumer drags this into an e-mail message. At step 314, the player software binds together Object ID(s), SKU ID, Disk ID, Consumer ID and identifiers for the value chain participants, e.g. Distributor ID, and Retailer ID. Additionally, for synchronization it adds the Temporal Location ID, the Temporal State ID, the Local Time ID and Absolute Time ID to the handle. At step 316, this handle is placed into the e-mail message. At step 318, the message is sent to or seen by (as in chat environments) the recipient(s). At step 320, the recipient opens or accesses the handle. At step 322, the e-mail application communicates with the operating system to call the application which the consumer has designated to resolve handles, usually, a player application. At step 324, the player renders the content (if it has the right to), and if it is accessible (usually stored locally).

The Consumer Player resolves the objects temporally in the following manner: At step 326, the player subtracts the Absolute Time ID in the handle (when the handle was created) from the current absolute time to find the amount of time lapsed between the instantiation of the handle and its resolution. The result is the Transport Time. At step 328, the player takes the Temporal Location ID (where in the object (song) the sender was when they sent it) and adds the Transport Time to determine where in the object (song) the sender is now. At step 324, the player renders the object beginning at that time according to the Temporal State ID (e.g. play).

For example, assume that the sender and recipient each have the content resident locally and that it takes eight seconds from sending the e-mail until the recipient receives it. The sender begins to play the content and then decides to e-mail the recipient to synchronize playing the content. By the time the recipient receives the e-mail, the sender has experienced eight seconds of the content. Hence the recipient's player will start playing the content an additional eight seconds into the content to that it is perfectly synchronized with the sender's experience of the content with respect to an absolute time.

An Affinity Group or Chat session refers to various communications between consumers through the same network including one-to-one communication, one-to-many communication, moderated or un-moderated group communication, Instant Messages, etc. In the context of Chat there can be multiple membership affinities based upon consumer defined preferences. Consumers can be members of multiple Affinity Groups and each of these Groups can be controlled independently and simultaneously in terms of privacy and availability parameters. Examples of some group definition are as follows: the Engineering Group available for Chat between 9:00 AM and 5:00 PM, Monday through Friday; a group of close family members available for Chat at all times; an Online Gaming Group available for Chat whenever the consumer is playing a game on-line (a consumer's preferences allow the consumer to filter the group for a specific game or any game the consumer is playing); a No Doubt fan club available for Chat whenever the consumer is listening to No Doubt; a Foreign Film Group available for Chat whenever the consumer is on a film site registered by the consumer or the film site.

Dynamic Chat includes the ability to make the consumer available to an Affinity Group based upon consumer activity or external events. For example, a consumer plays a piece of music through a device (PC, DVD Audio Player, Interactive TV, Handheld Device, etc.) with an online connection (telephone, cable, cellular, satellite, etc). Once the music begins to play (either by inserting a disk into a drive or playing a stored file), the consumer is made available to a Dynamic Affinity (Chat) Group based upon the music they are listening to. A screen prompt (depending upon consumer preference) may be displayed asking the consumer if they would like to chat with others currently listening to the same or similar music. Participation in the Affinity Groupings may be overlapping because consumers may participate in multiple groups. The consumer can determine the basis or metric defining the group. For example the consumer may choose to chat with people listening to the same track, album, artist, or genre. If the members of the chat are interested in synchronizing the music they are listening to, a Synch Handle can be dragged from the player (see above) into the Chat Window. When the recipient sees (receives) the Synch Handle, the recipient can activate (double-click) it and their music will be synchronized. If the recipient does not have the content or if it is on a disk not currently inserted, they are prompted to insert the disk or acquire the music.

Consumer availability can also be influenced (dependent upon subscriber preferences) by subscription or usage information. The consumer can look, for example, for others watching a television program or a particular movie, others interested in recipes or a particular sport, or others in a certain situation or geographic location. The categories, Television, Movies, Recipes, Sports, etc, serve as metrics to assist in forming Affinity Groups.

Web sites and Chat windows can interact in a number of ways. While browsing a web site, a consumer can become available to anyone else browsing that site or anyone browsing that site who shares any of the consumer's selection of metrics.

Technical information or support for various purposes may be facilitated by the use of handles. For example, if the consumer requires technical assistance regarding a product or feature, a reference or pointer to the source for such technical information or support may be included in the handle. When such technical information is needed, the reference in the handle may be used to access and download the information. Alternatively, all or part of the technical support information may be included directly in the handle. A consumer may access technical support on one occasion and keep the information for future reference by storing it locally. Once information is stored locally, it may be updated by using the reference in the handle to locate and download the updated information.

Figure 14:
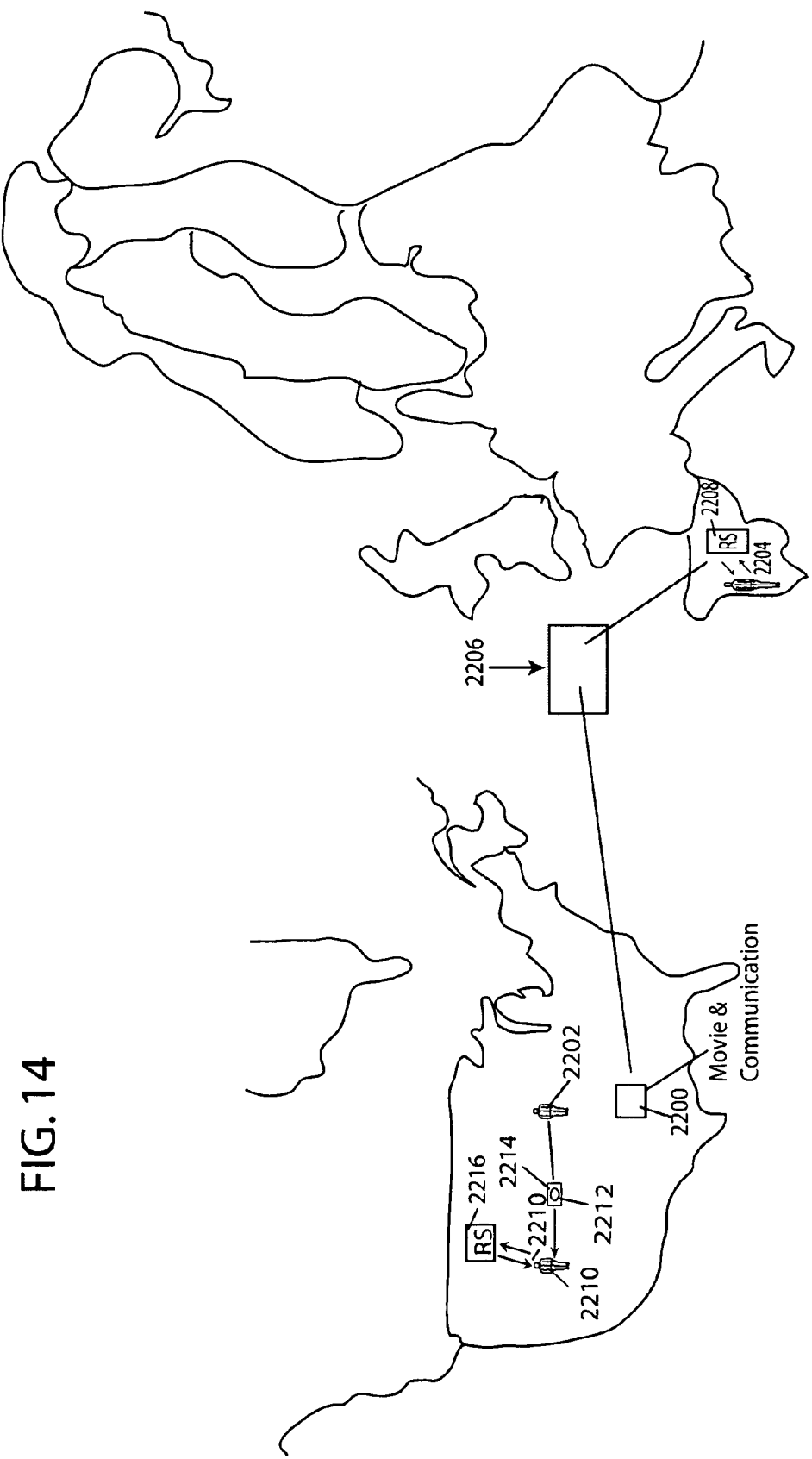
FIG. 14 illustrates an example of utilizing both Content Reference and e-contracts.

An example utilizing both Content Reference and e-contracts is illustrated in FIG. 14. Consumer A 2202, living in the United States wants to share a piece of content 2200, e.g. a movie, with consumer B 2204 in Spain. In prior art systems, an absolute locator could be sent by consumer A 2202 to consumer B 2204. However, consumer B 2204 may not be able to use the same service as consumer A 2202 to access the content 2200. Also consumer B 2204 may want to view the movie in Spanish, thus an absolute locator for content 2200 may not allow consumer B 2204 to access the content. However, when consumer A 2202 transmits a handle 2206 to consumer B 2204 and consumer B 2204 accesses the handle 2206, consumer B 2204 is presented with different options. Handle 2206 contains the information about the content 2200, the location of consumer A 2202 and consumer B 2204. The Reference Service 2208 then accesses the e-contract database and determines that the candidate offer therein is not valid in Spain. The Reference Service 2208 then analyzes all of the rules regarding the distribution of the content 2200 in Spain. Consumer B 2204 is then presented with, for example, two different certified retail offers, one is an offer to purchase the content on media (the media options can be determined from the Media ID) and the other offer is to pay-for-view from a local cable company. Once consumer B 2204 selects an offer, the appropriate parties in the value chain are compensated.

An example of superdistribution is consumer A 2202 drags a handle 2212 into an e-mail 2214 to consumer C 2210, also in the United States. Consumer C 2210 opens the e-mail 2214 and accesses the handle 2212. Consumer C's player on her local computer is referenced to see if consumer C 2210 already possesses the content. If consumer C 2210 does not possess the content, handle 2212 is accessed and the player communicates with a Reference Service 2214 to find a certified retail offer for the content (which may include, first selecting a candidate retail offer to be validated). Consumer C 2210 then accepts the offer and receives the content. A similar example of superdistribution between consumer A 2202 and consumer B 2204 can also be performed by handle 2212. Here, once consumer B 2204 accesses the superdistributed handle 2212, the appropriate retailer/distributor in Spain provides the candidate/certified retail offer to consumer B 2204.

Another example is for synchronized superdistribution. Consumer A 2202 and consumer B 2204 are communicating using an instant messaging (IM) service. Consumer A 2202 is, for example, listening to a piece of musical content. Consumer A drags handle 2206 for the content 2200 being played into the IM window and it is instantly received by consumer B 2204. Consumer B's player can synchronize with consumer A's player and the content can be streamed to consumer B's player and begin playing at the exact position within the content that consumer A 2202 is listening to. Another option is that consumer B 2204 already has the content and consumer B's player can access the content locally and synchronize the playing of the content 2200 with consumer A 2202.

While the invention has been particularly shown and described with reference to a preferred embodiment thereof, it will be understood by those skilled in the art that various changes in form and details may be made therein without departing from the spirit and scope of the invention.

We claim:

1. A method for distributing content over a computer network, comprising the steps of:

providing a predetermined electronic contract for distributing the content between a retailer and a distributor, wherein terms of the contract are independent of the content and the retailer distributes the content to a consumer and the distributor has rights in the content;

presenting a candidate retail offer for the distribution of the content to the consumer on a consumer computer;

receiving a request from the consumer, from the consumer computer over the computer network, to exercise the candidate retail offer;

validating, at a reference service, the candidate retail offer for the distribution of the content by accessing the electronic contract and determining if the candidate retail offer is consistent with the electronic contract;

upon successful validation, providing the content to the consumer;

receiving compensation information from the consumer indicating at least the amount of compensation for the content provided;

allocating, at a financial clearinghouse, the compensation according to the electronic contract;

dynamically updating the electronic contract; and applying the electronic contract to the distribution of the content only after receiving the request from the consumer.

2. The method as in claim 1, wherein the validating step further comprises the steps of:
referencing, in the electronic contract, one or more terms for distribution of the content;
comparing the candidate retail offer to the one or more distribution terms; and
validating the candidate retail offer when the candidate retail offer is consistent with the one or more distribution terms.

3. The method as in claim 2, wherein the one or more distribution terms comprise contractual terms of agreement for distribution of the content by the retailer.

4. The method as in claim 1, wherein the allocating step further comprises allocating to at least one of the retailer and the distributor a predetermined portion of the compensation according to one or more financial terms in the electronic contract.

5. The method as in claim 1, further comprising:
providing the electronic contract at a central location;
receiving the request from the consumer at the central location; and
receiving the payment information at the central location.

6. The method as in claim 1, wherein the content is at least one of electronic content and physical content.

7. A method for validating an offer for the distribution of electronic content by a distributor and retailer over a computer network, wherein the method includes computing apparatus, comprising the steps of:
a. receiving one or more electronic distribution contracts, between the distributor and the retailer, governing the distribution of the electronic content at the reference service;
b. receiving a candidate offer from the retailer;
c. checking, at the reference service, the candidate offer against the one or more electronic distribution contracts upon receiving the candidate offer, wherein the checking step comprises the step of referencing terms of the one or more electronic distribution contracts in a predetermined order;
d. sending an indication of validation to the retailer when the candidate offer is determined to be consistent with the one or more electronic contracts;
e. dynamically updating the one or more electronic distribution contracts; and
f. referencing the terms of the one or more electronic distribution contracts only after receiving a request from a consumer.

8. The method of claim 7, further comprising the steps of:
a. receiving one or more electronic financial contracts from a distributor, each representing one or more terms for setting a transaction, wherein the one or more electronic financial contracts are between the distributor and the retailer;
b. providing a candidate retail offer for the electronic content to the consumer;
c. receiving a request from the consumer to exercise the candidate retail offer for the electronic content;
d. distributing the electronic content to the consumer;
e. receiving payment information from the consumer indicating at least the compensation paid for the electronic content; and
f. referencing the one or more electronic financial contracts to determine the portion of compensation to be allocated to the distributor.

9. The method as in claim 7, wherein the predetermined order indicates a hierarchical relationship between the one or more electronic contracts.

10. The method of claim 7, further comprising:
receiving the electronic distribution contracts at a central location; and
receiving the candidate offer at the central location.

11. A method for distributing content over a computer network, comprising the steps of:
providing a first electronic contract for distributing the content between a first value chain participant and a second value chain participant;
dynamically updating the first electronic contract;
receiving a request from the second value chain participant, from the computer of the second value chain participant, for the delivery of the content from the first value chain participant;
comparing the request to the first electronic contract, upon receiving the request;
validating, at a reference service, the request if the request is consistent with the first electronic contract;
upon successful validation, delivering the content to the second value chain participant; and
applying the first electronic contract to the distribution of the content only after receiving the request from the second value chain participant.

12. The method of claim 11, further comprising the steps:
providing a second electronic contract for distributing the content between the first value chain participant and the second value chain participant;
comparing the request to the second electronic contract;
validating the request if the request is consistent with the second electronic contract; and
upon successful validation, delivering the content to the second value chain participant.

13. The method of claim 11 wherein the first electronic contract is stored at one of a same network location and a different network location as the second electronic contract.

14. A method for distributing content over a computer network, comprising the steps of:
providing a first electronic contract for distributing the content between a first value chain participant and a second value chain participant;
dynamically updating the first electronic contract;
receiving a request from the second value chain participant, from the computer of the second value chain participant, to distribute the content to a third value chain participant;
comparing the request to the first electronic contract;
validating, at the reference service, the request if the request is consistent with the first electronic contract;
upon successful validation, permitting the delivery the content to the third value chain participant; and
applying the first electronic contract to the distribution of the content only after receiving the request from the second value chain participant.

15. The method of claim 14, further comprising the steps of:
upon successful transaction, compensating at least one of the first value chain participant and the second value chain participant according to the electronic contract.

16. The method of claim 14, further comprising the steps of:
transmitting a handle identifying the content from the second value chain participant to a third value chain participant; and
accessing, by the third value chain participant, the handle to request the content from the first value chain participant.

17. The method of claim 16, wherein the first electronic contract includes contractual terms of agreement including at least one of how many times the content was distributed between value chain participants, a date since an original release of the content and a date since a certain transaction; further comprising the steps of:
- transmitting a handle identifying the content from the third value chain participant to a fourth value chain participant, wherein the handle identifies at least one of how many times the content was distributed between value chain participants, a date since the original release of the content, a date since the transaction by the third value chain participant;
- accessing the handle, by the fourth value chain participant, to make a second request the content from the first value chain participant;
- comparing the second request to the first electronic contract;
- validating the second request if the second request is consistent with the first electronic contract; and
- upon successful validation, delivering the content to the fourth value chain participant.

18. A method for delivering electronic content using a computer network comprising the steps of:
- sending a handle that is at least one of generated by a processor, stored on a computer of a first consumer, and stored on a server, from a first consumer to a second consumer;
- at a central location, receiving from said second consumer a request to render the electronic content identified by the handle;
- determining whether the second consumer is authorized to render the electronic content, further comprising the steps of:
  - referencing an offer associated with the handle received from the second consumer;
  - dynamically updating an electronic contract between a distributor and a retailer, governing the distribution of the electronic content, and that is the basis for the offer;
  - verifying, at a reference service, the validity of the associated offer; and
  - determining whether the request to render is consistent with the associated offer;
- at the second consumer, rendering the electronic content when the second consumer is authorized to use the electronic content; and
- applying the electronic contract to the distribution of the content only after receiving the request from the second consumer.

19. The method as in claim 18, further comprising the step of providing the electronic content identified by the handle to the second consumer.

20. The method as in claim 18, further comprising the steps of:
- a. providing the second consumer with one or more offers for the electronic content; and
- b. receiving from the second consumer a selection of one of the offers for the electronic content.

21. A method for distributing electronic content using a computer network comprising the steps of:
- creating, with a processor, a handle relating to the electronic content, wherein the handle only refers to the electronic content;
- selecting, by a user at a user computer, the handle;
- determining an offer for the selected handle at a reference service, comprising the steps of:
  - referencing the offer associated with the handle;
  - dynamically updating an electronic contract between a distributor and a retailer, governing the distribution of the electronic content, and that is the basis for the offer; and
  - verifying the validity of the associated offer;
- returning the offer to the user;
- waiting for a request from the user for the electronic content associated with the offer; and
- applying the electronic contract to a distribution of the electronic content only after receiving the request from the user.

* * * * *